US011708775B2

(12) United States Patent
Wang et al.

(10) Patent No.: US 11,708,775 B2
(45) Date of Patent: *Jul. 25, 2023

(54) SYSTEMS AND METHODS FOR DYNAMIC CONTROL OF FILTRATION EFFICIENCY AND FUEL ECONOMY

(71) Applicant: Cummins Emission Solutions Inc., Columbus, IN (US)

(72) Inventors: Yujun Wang, Columbus, IN (US); John K. Heichelbech, Columbus, IN (US); Changsheng C. Su, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,135

(22) Filed: Mar. 22, 2022

(65) Prior Publication Data

US 2022/0213822 A1 Jul. 7, 2022

Related U.S. Application Data

(62) Division of application No. 17/280,420, filed as application No. PCT/US2018/053400 on Sep. 28, 2018, now Pat. No. 11,480,082.

(51) Int. Cl.
*F01N 3/02* (2006.01)
*B01D 46/00* (2022.01)
(Continued)

(52) U.S. Cl.
CPC ......... *F01N 3/032* (2013.01); *B01D 46/0086* (2013.01); *B01D 46/0087* (2013.01);
(Continued)

(58) Field of Classification Search
CPC ............ B01D 46/0086; B01D 46/0087; B01D 46/444; B01D 46/446; B01D 46/448;
(Continued)

(56) References Cited

U.S. PATENT DOCUMENTS 2,674,197 A 4/1954 Dudley
4,319,453 A 3/1982 Mann
(Continued)

FOREIGN PATENT DOCUMENTS

CN 107060955 A 8/2017
EP 1 304 152 A1 4/2003
(Continued)

OTHER PUBLICATIONS

Notice of Allowance for U.S. Appl. No. 17/280,420, dated Jul. 15, 2022.
(Continued)

*Primary Examiner* — Audrey B. Walter
*Assistant Examiner* — Dapinder Singh
(74) *Attorney, Agent, or Firm* — Foley & Lardner LLP

(57) ABSTRACT

A filtration assembly for removing particulate matter from exhaust gas produced by an engine, including: a first filter; a second filter positioned downstream of the first filter; and a valve including: a first ring defining a plurality of first openings, and a second ring defining a plurality of second openings, the second ring abutting the first ring. The valve is moveable between a closed position in which the plurality of first openings are misaligned with the plurality of second openings to prevent a fluid from flowing through the plurality of first and second openings, and an open position in which the second ring is rotated relative to the first ring such that the plurality of first openings are aligned with the plurality of second openings allowing the fluid to flow therethrough. A first end of the valve is positioned at an
(Continued)

outlet of the first filter, and a second end of the valve is positioned at an inlet of the second filter. In the closed position of the valve, substantially all of the exhaust gas flows through the second filter, and in the open position of the valve, at least a portion of the exhaust gas flows through the valve and bypasses the second filter.

4 Claims, 14 Drawing Sheets

(51) Int. Cl.
    *B01D 46/46* (2006.01)
    *F01N 3/10* (2006.01)
    *F01N 3/20* (2006.01)
    *B01D 53/94* (2006.01)
    *F01N 3/032* (2006.01)
    *B01D 46/62* (2022.01)
    *B01D 46/82* (2022.01)
    *B01D 46/44* (2006.01)
    *F01N 3/022* (2006.01)
    *F01N 3/023* (2006.01)
    *F01N 3/035* (2006.01)
    *F01N 11/00* (2006.01)

(52) U.S. Cl.
    CPC ........ *B01D 46/444* (2013.01); *B01D 46/446* (2013.01); *B01D 46/448* (2013.01); *B01D 46/46* (2013.01); *B01D 46/62* (2022.01); *B01D 46/82* (2022.01); *B01D 53/944* (2013.01); *B01D 53/9418* (2013.01); *B01D 53/9477* (2013.01); *F01N 3/022* (2013.01); *F01N 3/023* (2013.01); *F01N 3/035* (2013.01); *F01N 3/103* (2013.01); *F01N 3/106* (2013.01); *F01N 3/2066* (2013.01); *F01N 11/002* (2013.01); *B01D 2255/904* (2013.01); *B01D 2279/30* (2013.01); *F01N 2410/04* (2013.01); *F01N 2550/04* (2013.01)

(58) Field of Classification Search
    CPC ........ B01D 46/46; B01D 46/42; B01D 46/82; B01D 53/9418; B01D 53/944; B01D 53/9477; B01D 2255/904; B01D 2279/30; F01N 3/021; F01N 3/022; F01N 3/035; F01N 3/0222; F01N 9/002; F01N 2330/06; Y02T 10/12; Y02T 10/40
    See application file for complete search history.

(56) References Cited

U.S. PATENT DOCUMENTS

| | | |
|---|---|---|
| 4,512,147 A | 4/1985 | Wong |
| 5,052,178 A | 10/1991 | Clerc et al. |
| 5,212,948 A | 5/1993 | Gillingham et al. |
| 5,950,576 A | 9/1999 | Busato et al. |
| 6,378,509 B1 | 4/2002 | Feucht et al. |
| 7,263,824 B2 | 9/2007 | Bellinger et al. |
| 7,314,501 B2 | 1/2008 | Fayard |
| 7,806,956 B2 | 10/2010 | Anderson et al. |
| 7,987,667 B2 | 8/2011 | Meier et al. |
| 8,240,138 B2 | 8/2012 | Lu et al. |
| 8,307,630 B2 | 11/2012 | Askew |
| 8,327,628 B2 | 12/2012 | Ruona et al. |
| 8,615,990 B2 | 12/2013 | Wilhelm et al. |
| 8,713,936 B2 * | 5/2014 | Joergl ............ F02M 26/71 123/568.24 |
| 10,000,347 B2 | 6/2018 | Newton et al. |
| 2006/0037594 A1 | 2/2006 | Rutten |
| 2006/0266025 A1 | 11/2006 | Zheng et al. |
| 2009/0120076 A1 | 5/2009 | Bailey et al. |
| 2017/0234196 A1 * | 8/2017 | Ulrey ............ F01N 9/002 60/274 |
| 2017/0321583 A1 | 11/2017 | Gibby |
| 2019/0017423 A1 | 1/2019 | Martin et al. |
| 2019/0178141 A1 | 6/2019 | Kim et al. |
| 2020/0386332 A1 * | 12/2020 | Zonneveld ........ F16K 27/045 |

FOREIGN PATENT DOCUMENTS

| | | |
|---|---|---|
| JP | H07-54640 | 2/1995 |
| WO | WO-2006/066043 A | 6/2006 |
| WO | WO-2006/125516 A | 11/2006 |

OTHER PUBLICATIONS

First Office Action issued for Chinese Patent Application No. CN 201880098216.2 dated Feb. 15, 2022, 12 pages.
International Search Report and Written Opinion Issued in PCT/US 2018/053400, dated Feb. 1, 2019, 27 pages.

* cited by examiner

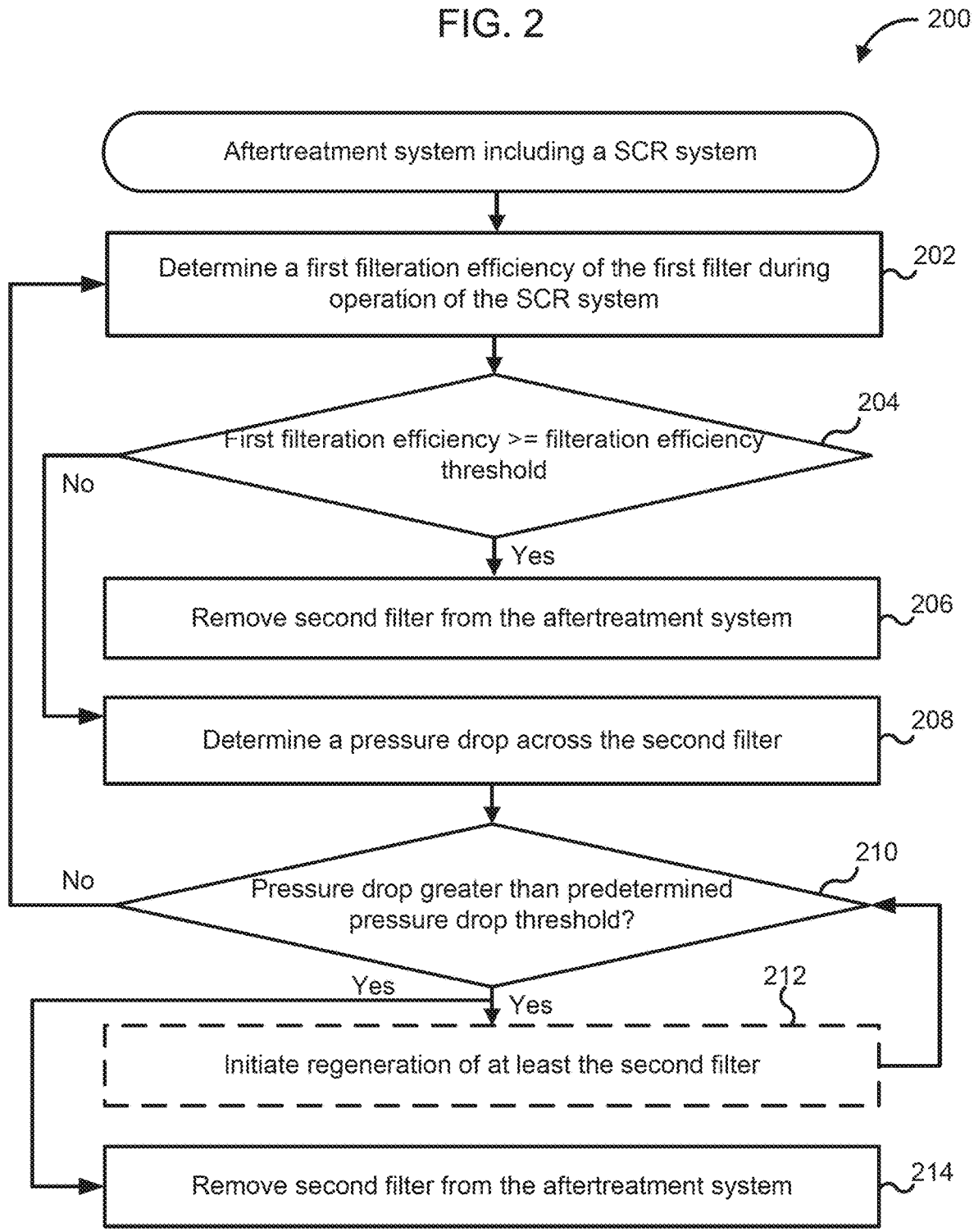

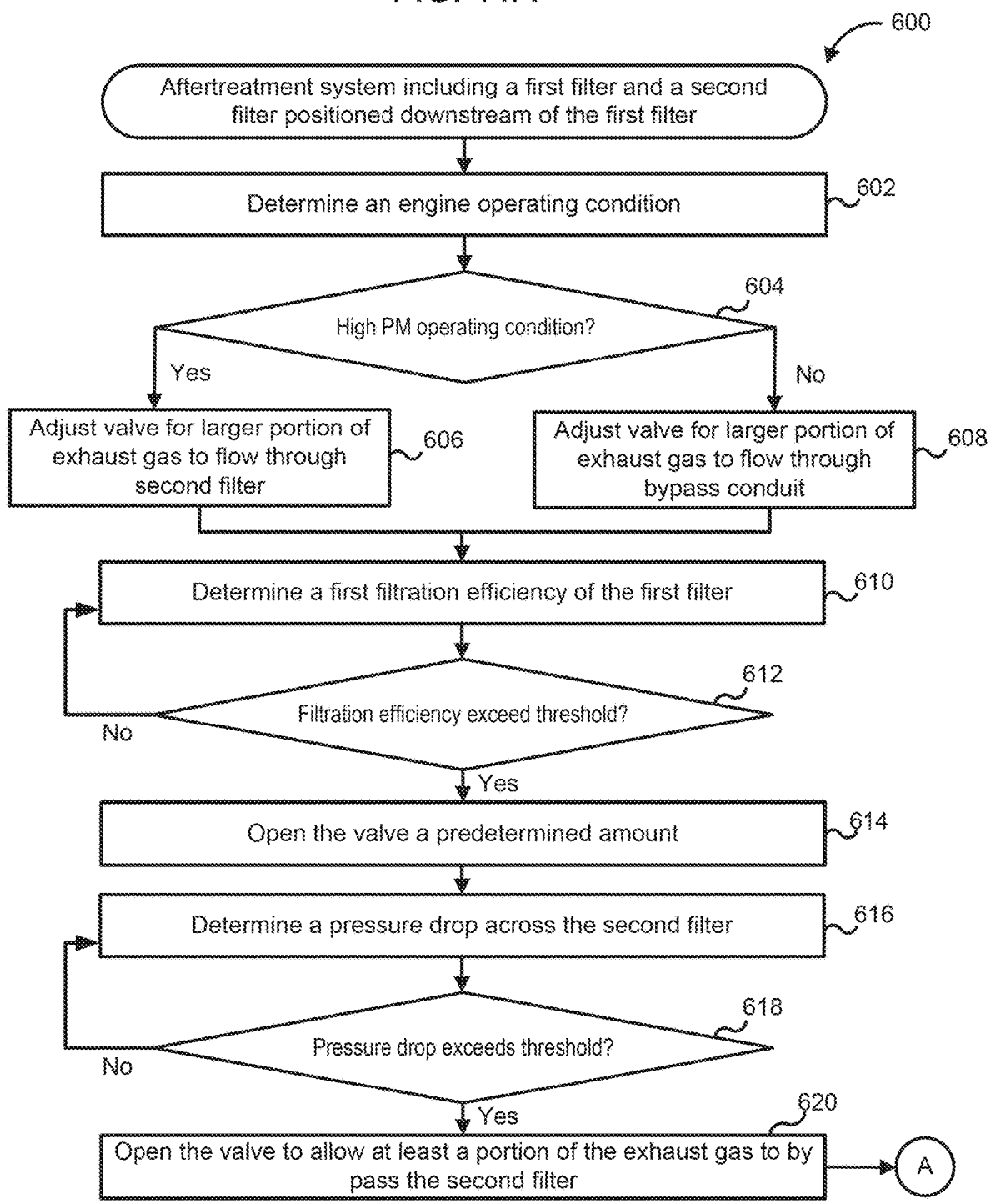

SYSTEMS AND METHODS FOR DYNAMIC CONTROL OF FILTRATION EFFICIENCY AND FUEL ECONOMY

CROSS-REFERENCE TO RELATED APPLICATIONS

The present application is a divisional of U.S. patent application Ser. No. 17/280,420, filed Mar. 26, 2021, which is a National Phase Application of PCT/US2018/053400, filed Sep. 28, 2018. The contents of these applications are hereby incorporated by reference in their entireties.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Aftertreatment systems may also include a filter such as a partial flow filter, configured to remove particulate matter (PM), for example, soot, dust, inorganic particles, etc. from the exhaust gas. Increasingly stringent PM emission standards require the filter to remove PM with high filtration efficiency. Filters having high filtration efficiency however, exert a high backpressure on exhaust gas flowing through the aftertreatment system which may reduce fuel economy of the engine.

SUMMARY

Embodiments described herein relate generally to systems and methods for controlling operation of an aftertreatment system for high filtration efficiency or high fuel economy based on an operating condition of an engine producing the exhaust gas. In particular, embodiments described herein relate to aftertreatment system that include a first filter, a second filter having a smaller pore size than the first filter positioned downstream of the first filter for providing high filtration efficiency, and a bypass conduit for selectively bypassing flow of the exhaust gas around the second filter when high fuel economy is desired while meeting PM emission standards.

In some embodiments, an aftertreatment system configured to reduce constituents of an exhaust gas produced by an engine comprises a first filter and a second filter disposed downstream of the first filter. A bypass conduit fluidly couples an exhaust gas flow path downstream of the first filter and upstream of the second filter to an exhaust gas flow path downstream of the second filter. A valve is operatively coupled to the bypass conduit, the valve moveable between a closed position in which the exhaust gas flows through the second filter, and an open position in which at least a portion of the exhaust gas flows through the bypass conduit so as to bypass the second filter. A controller is operatively coupled to the valve and is configured to determine whether a first filtration efficiency of the first filter is greater than a first filtration efficiency threshold or less than or equal to the first filtration efficiency threshold. The controller is configured to control the valve such that the valve is more closed when the first filtration efficiency is less than or equal to the first filtration efficiency threshold than when the first filtration efficiency is greater the first filtration efficiency threshold, such that a larger portion of the exhaust gas flows through the second filter when the first filtration efficiency is less than the first filtration efficiency threshold, the controlling of the valve causing the exhaust gas expelled into the environment from the aftertreatment system to have a PM count which is lower than a predetermined threshold.

In some embodiments, an aftertreatment system configured to reduce constituents of an exhaust gas produced by an engine comprises, a first filter, and a second filter disposed downstream of the first filter. A bypass conduit fluidly couples an exhaust gas flow path downstream of the first filter and upstream of the second filter to an exhaust gas flow path downstream of the second filter. A valve is operatively coupled to the bypass conduit. The valve is moveable between a closed position in which the exhaust gas flows through the second filter, and an open position in which at least a portion of the exhaust gas flows through the bypass conduit so as to bypass the second filter. A controller is operatively coupled to the valve. The controller is configured to determine whether the engine is operating in a high particulate matter operating condition or a low particulate matter operating condition. The controller is configured to control the valve such that the valve is more closed during the high particulate matter operating condition of the engine than during the low particulate matter operating condition of the engine, such that a larger portion of the exhaust gas flows through the second filter during the high particulate matter operating condition of the engine than during the low particulate matter operating condition of the engine, the controlling of the valve causing the exhaust gas expelled into the environment from the aftertreatment system to have a PM count which is lower than a predetermined threshold.

In some embodiments, an aftertreatment system for reducing constituents of an exhaust gas produced by an engine comprises a first filter and a second filter positioned downstream of the first filter. A controller is operably coupled to the first and second filters and is configured to determine a first filtration efficiency of the first filter during operation of the aftertreatment system. In response to the first filtration efficiency being equal to or greater than a first filtration efficiency threshold, the controller is configured to generate a fault code instructing a user to remove the second filter from the aftertreatment system.

In some embodiments, a valve comprises a plurality of rings comprising a first ring defining a plurality of first openings, and a second ring defining a plurality of second openings. The second ring abuts the first ring. The valve is moveable between a closed position and an open position. In the closed positioned, the plurality of first openings are misaligned with the plurality of second openings to prevent a fluid from flowing through the plurality of first and second openings. In the open position, the second ring is rotated relative to the first ring such that the plurality of first openings are aligned with the plurality of second openings allowing the fluid to flow therethrough.

In some embodiments, an aftertreatment system configured to reduce constituents of an exhaust gas produced by an engine comprises a first filter and a second filter disposed downstream of the first filter. A bypass conduit fluidly couples at least one of an exhaust gas flow path upstream of the first filter to an exhaust gas flow path between the first filter and the second filter or an exhaust gas flow path between the first filter and the second filter to an exhaust gas flow path downstream of the second filter. A valve is operatively coupled to the bypass conduit, the valve moveable between a closed position in which the exhaust gas flows through the second filter, and an open position in which at least a portion of the exhaust gas flows through the bypass conduit so as to bypass the second filter. A controller is operatively coupled to the valve. The controller is configured to determine whether the engine is operating in a high PM operating condition or a low PM operating condition. The controller is configured to control the valve such that the valve is more closed during the high PM operating condition of the engine than during the low PM operating condition of the engine, such that a larger portion of the exhaust gas flows through the second filter during the high PM operating condition of the engine than during the low PM operating condition of the engine, the controlling of the valve causing the exhaust gas expelled into the environment from the aftertreatment system to have a PM count which is lower than a predetermined threshold.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIG. 2 is a schematic flow diagram of an example method to control filtration efficiency of an aftertreatment system, according to an embodiment.

FIGS. 11A-11B are schematic flow diagrams of a method for dynamically controlling filtration efficiency of an aftertreatment system, and fuel economy of an engine fluidly coupled to an aftertreatment system, according to an embodiment.

Figure 1:
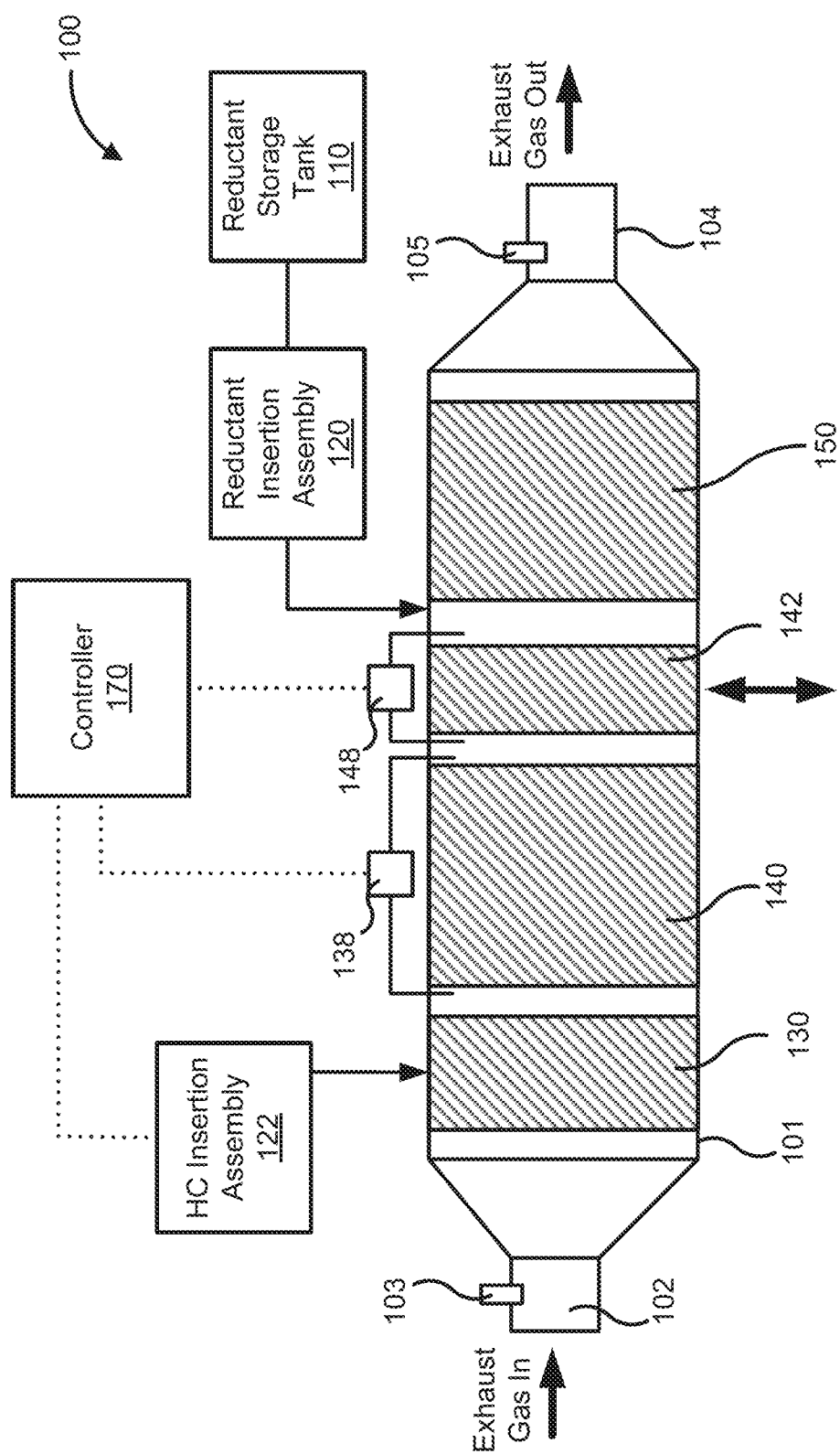
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for controlling operation of an aftertreatment system for high filtration efficiency or high fuel economy based on an operating condition of an engine producing the exhaust gas. In particular, embodiments described herein relate to aftertreatment systems that include a first filter, a second filter having a smaller pore size than the first filter and positioned downstream of the first filter for providing high filtration efficiency, and a bypass conduit for selectively bypassing flow of the exhaust gas around the second filter when high fuel economy is desired while meeting PM emission standards.

Increasingly stringent PM emission standards on exhaust gas emitted from aftertreatment systems require that filters included in aftertreatment systems remove PM with high filtration efficiency. For example, China is implementing very strict regulations on PM emission from aftertreatment systems. Conventional aftertreatment systems only allow a short preconditioning time which creates challenges in the ash limited filter performance. Filters included in conventional aftertreatment systems may have open pores which allow a large amount of PM (e.g., soot or ash) to flow therethrough during the preconditioning phase, for example, when the aftertreatment system is operated for the first time or after regeneration of the filter when there is no PM, or negligible amount of PM trapped in the filter. This allows a large amount of PM to flow through the filter during the preconditioning phase. While the PM accumulation in the filter over time reduces the porosity of the filter and eventually increases the filtration efficiency of the filter to a desirable level, the passage of the higher amount of PM through the filter during the preconditioning phase is undesirable. Filters having high filtration efficiency can address the PM issue. However, such filters exert a high backpressure on the exhaust gas flowing through the aftertreatment system which reduces fuel economy of the engine. Moreover, conventional aftertreatment systems typically include the filter located upstream of a location of an SCR system. This allows PM generated from the decomposition of reductant into the SCR system or to pass out of the aftertreatment system unfiltered, increasing the PM count. In some arrangements, reductant insertion can increase PM count downstream of the filter by 400%-600% due to reductant insertion and reaction with the exhaust gas in the SCR system.

Various embodiments of the systems and methods described herein provide benefits including, for example: (1) providing a high filtration efficiency during and after the preconditioning phase or during high PM operating condition of an engine by disposing a second smaller pore size filter downstream or upstream of a first larger pore size filter; (2) reducing PM count during reductant insertion in the exhaust gas by disposing the second filter downstream of an SCR system of the aftertreatment system; (3) providing high filtration efficiency during high PM operating conditions and providing high fuel economy during low PM operating conditions while meeting emission standards by selectively bypassing at least a portion of the exhaust gas around the second filter (4) allowing installation in existing aftertreatment systems with minimum modifications; and/or (5) reducing durability concerns by allowing selective removal of the second filter from the aftertreatment system.

FIG. 1 is a schematic illustration of an aftertreatment system 100, according to an embodiment. The aftertreatment system 100 is configured to receive an exhaust gas from an engine (e.g., a diesel engine, a gasoline engine, a natural gas engine, a dual fuel engine, a biodiesel engine, an E-85 engine, or any other suitable engine) and reduce constituents of the exhaust gas such as, for example, NOx gases, CO, hydrocarbons, etc. The aftertreatment system 100 may comprise a reductant storage tank 110, a reductant insertion assembly 120, a housing 101, a first filter 140, a second filter 142 and a SCR system 150.

The housing 101 defines an internal volume within which the components of the aftertreatment system 100, i.e., the first filter 140, the second filter 142 and the SCR system 150 are positioned. The housing 101 may be formed from a rigid, heat-resistant and corrosion-resistant material, for example stainless steel, iron, aluminum, metals, ceramics, or any other suitable material. The housing 101 may have any suitable cross-section, for example circular, square, rectangular, oval, elliptical, polygonal, or any other suitable shape.

An inlet conduit 102 is fluidly coupled to an inlet of the housing 101 and structured to receive exhaust gas from the engine and communicate the exhaust gas to an internal volume defined by the housing 101. Furthermore, an outlet conduit 104 may be coupled to an outlet of the housing 101 and structured to expel treated exhaust gas into the environment (e.g., treated to remove PM such as soot and ash by the first and/or second filters 140 and 142 and/or reduce constituents of the exhaust gas such as NOx gases included in the exhaust gas).

A first sensor 103 may be positioned in the inlet conduit 102. The first sensor 103 may comprise a NOx sensor configured to measure an amount of NOx gases included in the exhaust gas flowing into the aftertreatment system 100 and may include a physical NOx sensor or a virtual NOx sensor. In other embodiments, the first sensor 103 may comprise an exhaust gas flow rate sensor. In various embodiments, a temperature sensor, a pressure sensor, an oxygen sensor or any other sensor may also be positioned in the inlet conduit 102 so as to determine one or more operational parameters of the exhaust gas flowing through the housing 101 of the aftertreatment system 100.

A second sensor 105 may be positioned in the outlet conduit 104. The second sensor 105 may comprise a second NOx sensor configured to determine an amount of NOx gases expelled into the environment after passing through the SCR system 150. In other embodiments, the second sensor 105 may comprise a PM sensor configured to determine an amount of PM (e.g., soot or ash included in the exhaust gas exiting the filter 140). In still other embodiments, the second sensor 105 may comprise an ammonia sensor configured to measure an amount of ammonia in the exhaust gas flowing out of the SCR system 150, i.e., determine the ammonia slip. This may be used as a measure of determining a catalytic efficiency of the SCR system 150, adjust an amount of reductant to be inserted into the SCR system 150, and/or adjust a temperature of the SCR system 150 so as to allow the SCR system 150 to effectively use the ammonia for catalytic decomposition of the NOx gases included in the exhaust gas flowing therethrough. In some embodiments, an ammonia oxidation (AMOx) catalyst may be positioned downstream of the SCR system 150, for example, in the outlet conduit 104 so as to decompose any unreacted ammonia in the exhaust gas downstream of the SCR system 150.

In some embodiments, the aftertreatment system 100 may also include an oxidation catalyst 130 (e.g., a diesel oxidation catalyst) disposed upstream of the first filter 140, for example, in the housing 101. The oxidation catalyst 130 may be configured to oxidize unburnt hydrocarbons and/or carbon monoxide included in the exhaust gas to $CO_2$.

The SCR system 150 includes an SCR catalyst formulated to decompose constituents of an exhaust gas flowing therethrough. In some embodiments, the SCR system 150 may comprise a selective catalytic reduction filter (SCRF), or any other aftertreatment component configured to decompose constituents of the exhaust gas (e.g., NOx gases such as such nitrous oxide, nitric oxide, nitrogen dioxide, etc.), flowing through the housing 101 in the presence of a reductant, as described herein.

Any suitable SCR catalyst may be used such as, for example, rhodium, cerium, iron, manganese, copper, vanadium based catalyst, any other suitable catalyst, or a combination thereof. The SCR catalyst may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the SCR catalyst such that any NOx gases included in the exhaust gas are further reduced to yield an exhaust gas which is substantially free of NOx gases.

In various embodiments, the aftertreatment system 100 may also include other aftertreatment components such as, for example, ammonia oxidation catalysts, mixers, baffle plates, or any other suitable aftertreatment component.

A reductant port (not shown) may be positioned on a sidewall of the housing 101 and structured to allow insertion of a reductant therethrough into the internal volume defined by the housing 101. The reductant port may be positioned upstream of the SCR system 150 (e.g., to allow reductant to be inserted into the exhaust gas upstream of the SCR system 150) or over the SCR system 150 (e.g., to allow reductant to be inserted directly on the SCR system 150). In other embodiments in which the reductant is inserted upstream of the SCR system 150, mixers, baffles, vanes or other structures may be positioned upstream of the SCR system 150 so as to facilitate mixing of the reductant with the exhaust gas.

The reductant storage tank 110 is structured to store a reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water, including 40% by volume of urea and 60% by volume of deionized water, or any other suitable ratio of urea to deionized water.

A reductant insertion assembly 120 is fluidly coupled to the reductant storage tank 110. The reductant insertion assembly 120 is configured to selectively insert the reductant into the SCR system 150 or upstream thereof (e.g., into the inlet conduit 102) or a mixer (not shown) positioned upstream of the SCR system 150. The reductant insertion assembly 120 may comprise various structures to facilitate receipt of the reductant from the reductant storage tank 110 and delivery to the SCR system 150.

In various embodiments, the reductant insertion assembly 120 may also include one or more pumps (e.g., a diaphragm pump, a positive displacement pump, a centrifugal pump, a vacuum pump, etc.) for delivering the reductant to SCR system 150 at an operating pressure and/or flow rate. The reductant insertion assembly 120 may also include filters and/or screens (e.g., to prevent solid particles of the reductant or contaminants from flowing into the one or more pumps) and/or valves (e.g., check valves) to receive reductant from the reductant storage tank 110.

Screens, check valves, pulsation dampers, or other structures may also be positioned downstream of the one or more pumps of the reductant insertion assembly 120 and configured to remove contaminants and/or facilitate delivery of the reductant to the SCR system 150. In various embodiments, the reductant insertion assembly 120 may also comprise a bypass line structured to provide a return path of the reductant from the one or more pumps to the reductant storage tank 110. A valve (e.g., an orifice valve) may be provided in the bypass line. In various embodiments, the reductant insertion assembly 120 may also comprise a blending chamber structured to receive pressurized reductant from a metering valve at a controllable rate. The blending chamber may also be structured to receive air (e.g., compressed air or portion of the exhaust gas), or any other inert gas (e.g., nitrogen), for example, from an air supply unit so as to deliver a combined flow of the air and the reductant to the SCR system 150 through the reductant port.

The aftertreatment system 100 may also comprise a reductant injector fluidly coupled to the reductant insertion assembly 120 and configured to insert the reductant (e.g., a combined flow of reductant and compressed air) into the SCR system 150. In various embodiments, the reductant injector may comprise a nozzle having predetermined diameter. In various embodiments, the reductant injector may be positioned in the reductant port and structured to deliver a stream or a jet of the reductant into the internal volume of the housing 101 so as to deliver the reductant to the SCR system 150.

In various embodiments, the reductant insertion assembly 120 may also comprise a dosing valve, for example positioned within a reductant delivery line for delivering the reductant from the reductant insertion assembly 120 to the SCR system 150. The dosing valve can comprise any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve, or any other suitable valve. The dosing valve may be selectively opened to insert a predetermined quantity of the reductant for a predetermined time into the SCR system 150 or upstream therefrom.

The first filter 140 is configured to remove PM (e.g., soot, debris, inorganic particles, etc.) from the exhaust gas. In various embodiments, the first filter 140 may include a ceramic filter. In particular embodiments, the first filter 140 may include a partial flow filter (e.g., a ceramic partial filter). In other embodiments, the first filter 140 may include a metallic partial flow filter. In still other embodiments, the first filter 140 may include a cordierite filter which can, for example, be an asymmetric filter. In yet other embodiments, the first filter 140 may be catalyzed.

The second filter 142 is disposed downstream of the first filter 140. While shown as being disposed upstream of the SCR system 150, in other embodiments, the second filter 142 may be disposed downstream of the SCR system 150. The second filter 142 may include a ceramic filter, a partial flow filter, a cordierite filter or any other filter as described with respect to the first filter 140. In some embodiments, the second filter 142 may include an uncoated filter.

In various embodiments, the first filter 140 may have a first pore size which is larger than a second pore size of the second filter 142 such that the second filter 142 has a higher filtration efficiency than a first filtration efficiency of the first filter 140. For example, certain emissions standards (e.g., in Europe or China) may place very high restrictions on PM emission from aftertreatment systems. During a preconditioning stage (e.g., when the aftertreatment system 100 is new or after regeneration of the first filter 140) the first filter 140 may have a porosity which allows a larger amount of PM to pass therethrough then is allowable by emission standards. Positioning the second filter 142 having a small pore size and thereby, a higher filtration efficiency than the first filtration efficiency of the first filter 140 downstream of the first filter 140, allows filtering of a higher amount of PM from the exhaust gas than would be possible by the first filter 140. For example, the first filter 140 may have a first filtration efficiency of 70%, and the second filter may 142 may have a second filtration efficiency of 90% such that the aftertreatment system 100 has an overall filtration efficiency of $1-(1-70\%)\times(1-90\%)=97\%$, higher than each of the filters 140 and 142 alone, thereby effectively meeting PM emission standards.

Over time as the exhaust gas continues to flow through the aftertreatment system 100, the first filter 140 may become increasingly clogged with PM which causes a decrease in its porosity and increase in its filtration efficiency. Over time, the first filtration efficiency of the first filter 140 reaches a first efficiency threshold at which the first filter 140 is able to meet PM emission standards. The first filtration efficiency may be based on a pressure drop across the first filter 140 (e.g., measured using a differential pressure sensor) and an exhaust gas flow rate of the exhaust gas, for example, a ratio of the pressure drop to the exhaust gas flow rate.

While the first filter 140 becomes increasingly clogged with PM resulting in an increase in its filtration efficiency, the second filter 142 also becomes increasingly clogged. This causes an increase in the backpressure on the exhaust gas causing a decrease in fuel economy of the engine. The second filter 142 may be removably coupled to the aftertreatment system 100, such that in response to first filtration efficiency first filter 140 reaching the first efficiency threshold, the second filter 142 may be removed from the aftertreatment system 100, for example, during a scheduled maintenance of the aftertreatment system 100, so as to decrease the backpressure. In some embodiments, the second filter 142 may be removed if a second pressure drop across the second filter 142 is greater than a predetermined pressure drop threshold which may correspond to a high backpressure.

In some embodiments, the aftertreatment system 100 may also comprise a controller 170 communicatively coupled to the first filter 140 and/or the second filter 142. In various embodiments, the controller 170 may be included in a control circuitry, for example, the control circuitry 371 described in further detail herein. The controller 170 is configured to determine the first filtration efficiency of the first filter 140 during operation of the aftertreatment system 100. For example, the first filter pressure sensor 138 (e.g., a differential pressure sensor or a delta pressure sensor) may be operatively coupled to the first filter 140 and configured to determine a pressure drop across the first filter 140. The controller 170 may be configured to interpret a pressure signal from the first filter pressure sensor 138 to determine a first pressure drop across the first filter 140. The controller 170 may also be configured to determine a flow rate of the exhaust gas (e.g., from a signal received from an exhaust flow sensor or based on operating condition of the engine). The controller 170 may determine the first filtration efficiency based on the first pressure drop and the flow rate of the exhaust gas (e.g., a ratio of the first pressure drop to the flow rate).

In response to the pressure drop being greater than a predetermined pressure drop threshold, the controller 170 generates a fault code instructing a user to remove the second filter 142 from the aftertreatment system 100. The fault code may be stored in a memory of a central controller of a vehicle or any other assembly including the aftertreatment system 100, which may be retrieved during a maintenance interval of the vehicle. In other embodiments, the controller 170 may also activate an indicator lamp (e.g., an indicator on a dash display), thereby informing the user that the second filter 142 should be removed.

In some embodiments, the controller 170 may also be configured to determine a pressure drop across the second filter 142. For example, a second filter pressure sensor 148 may be operably coupled to the second filter 142 and configured to determine a pressure drop thereacross. The controller 170 may be configured to interpret a pressure signal from the second filter pressure sensor 148 to determine a pressure drop across the second filter 142. In response to the pressure drop being greater than a predetermined pressure threshold (e.g., corresponding to second filter 142 being substantially clogged or a high back pressure exerted on the exhaust gas), the controller 170 generates the fault code.

In particular embodiments, the aftertreatment system 100 may also include a hydrocarbon (HC) insertion assembly 122 configured to insert hydrocarbons into the exhaust gas flow path on, or upstream of the oxidation catalyst 130. The inserted hydrocarbons are oxidized on the oxidation catalyst 130 and serve to increase the temperature of the exhaust gas to a temperature sufficient to oxidize PM trapped in the first and/or second filters 140 and 142 so as to regenerate the first and/or second filters 140 and 142.

For example, the filters 140 and/or 142 may become increasingly clogged with PM over time. This may increase filtration efficiency of the first and/or second filters 140 and 142 by reducing a porosity of the filters 140 and 142 as previously described herein, but also cause an increase in backpressure on the exhaust gas which reduces fuel efficiency. If not regenerated, the filters 140 and 142 may eventually become completely blocked with PM or the backpressure can become sufficiently high so as to crack the first and/or second filter 140 and 142. In some embodiments, the hydrocarbon insertion assembly 122 may be activated to insert hydrocarbons into the exhaust gas, for example, into or upstream of the oxidation catalyst 130, in response to a backpressure of the exhaust gas increasing beyond a predetermined pressure threshold which may correspond to an amount of clogging of the first and/or second filter 140 and 142. For example, the controller 170 may activate the hydrocarbon insertion assembly 122 in response to the pressure drop across the second filter 142 being greater than a predetermined pressure threshold. The hydrocarbons may combust in the exhaust gas, thereby increasing a temperature of the exhaust gas above a temperature threshold sufficient to oxidize PM trapped in the first and/or second filters 140 and 142 so as to regenerate the filters 140 and/or 142. For example, the second filter 142 may be regenerated before removal from the aftertreatment system 100.

FIG. 2 is a schematic flow diagram of a method 200 for controlling filtration efficiency of an aftertreatment system (e.g., the aftertreatment system 100) as fuel economy of an engine producing an exhaust gas flowing through the aftertreatment system, according to an embodiment. The aftertreatment system includes an SCR system (e.g., the SCR system 150) a first filter (e.g., the first filter 140) positioned upstream of the SCR system and a second filter (e.g., the second filter 142) positioned downstream of the first filter, for example, between the first filter and the SCR system or downstream of the SCR system. The second filter may have a smaller pore size than the first filter, as previously described herein with respect to the aftertreatment system 100.

The method 200 comprises determining a filtration efficiency of the first filter during operation of the aftertreatment system, at 202. For example, the filtration efficiency of the first filter 140 is determined by the controller 170. In some embodiments, the method 200 may also include determining a first pressure drop across the first filter, and a flow rate of the exhaust gas downstream of the first filter (e.g., by the controller 170). The filtration efficiency may be based on the first pressure drop and the flow rate of the exhaust gas, for example, a ratio of the pressure drop to the flow rate.

At 204, it is determined if the first filtration efficiency is equal to or greater than a first filtration efficiency threshold. In response to the first filtration efficiency of the first filter being equal to or greater the first filtration efficiency threshold (204:YES), the method 200 includes instructing a user to remove the second filter from the aftertreatment system, at 206. For example, as exhaust gas flows through the first filter 140, PM accumulates in the first filter 140 reducing its porosity and increasing its filtration efficiency. Once the first filtration efficiency of the first filter 140 reaches the first filtration efficiency threshold, corresponding to a desired filtration efficiency from the first filter 140, the first filter 140 may be sufficient to provide a desired filtration efficiency from the aftertreatment system 100 for meeting PM emission standards without the second filter 142. The user may be instructed via an audio signal (e.g., an alarm), a video signal (e.g., lighting an indicator lamp on a dashboard) or via a fault code (e.g., second filter remove code) generated by the controller 170, the fault code being available to the user on demand.

In some embodiments, the method 200 may also include determining a second pressure drop across the second filter in response to the first filtration efficiency being less than the filtration efficiency threshold, at 208. If the pressure drop across the second filter is less than a predetermined pressure drop threshold at 210, the method 200 returns to operation 202. In response to the second pressure drop being greater than a predetermined pressure drop threshold, in some embodiments, a regeneration of at least the second filter may be initiated, at 212. For example, the second filter 142 and optionally, also the first filter 140 may be heated above a regeneration temperature (e.g., via a heater coupled to the second filter 142 and/or the first filter 140 or flowing exhaust gas at a temperature greater than the regeneration through the aftertreatment system 100) to oxidize the accumulated PM (e.g., soot) in the second filter 142 and, in some embodiments, also the first filter 140. The method then returns to operation 210. If it is determined that the second pressure drop is still greater than the predetermined pressure drop, the user is instructed to remove the second filter, at 214. For example, the second pressure drop being above the predetermined pressure drop threshold may correspond to high back pressure exerted on the exhaust gas which may reduce a fuel economy of the engine producing the exhaust gas below a desirable level or damage the second filter 142.

In some embodiments, the second filter 142 may be rotatably mounted within the housing 101 and configured to rotate between a first configuration in which the second filter 142 is positioned within the exhaust gas flow path and a second configuration in which the second filter 142 rotated within the housing 101 to provide a flow path for the exhaust gas to bypass the second filter 142. For example, a biasing member (e.g., a spring) may be coupled to the second filter 142 and configured to bias the second filter 142 into the first configuration to cause the exhaust gas to flow through the second filter 142. As the second filter 142 gets increasing clogged, a pressure of the exhaust gas on the second filter 142 increases due to the decreasing porosity of the second filter 142. Once the pressure of the exhaust gas is equal to or greater than a predetermined pressure threshold which may occur after the first filter 140 has reached its filtration efficiency threshold, the pressure may be sufficient to overcome the biasing force of the biasing member to move the second filter 142 into the second configuration. This allows the exhaust gas to bypass the second filter 142, therefore reducing the backpressure on the exhaust gas and increasing fuel economy. This may obviate removing of the second filter 142 from the housing 101.

Figure 3A:
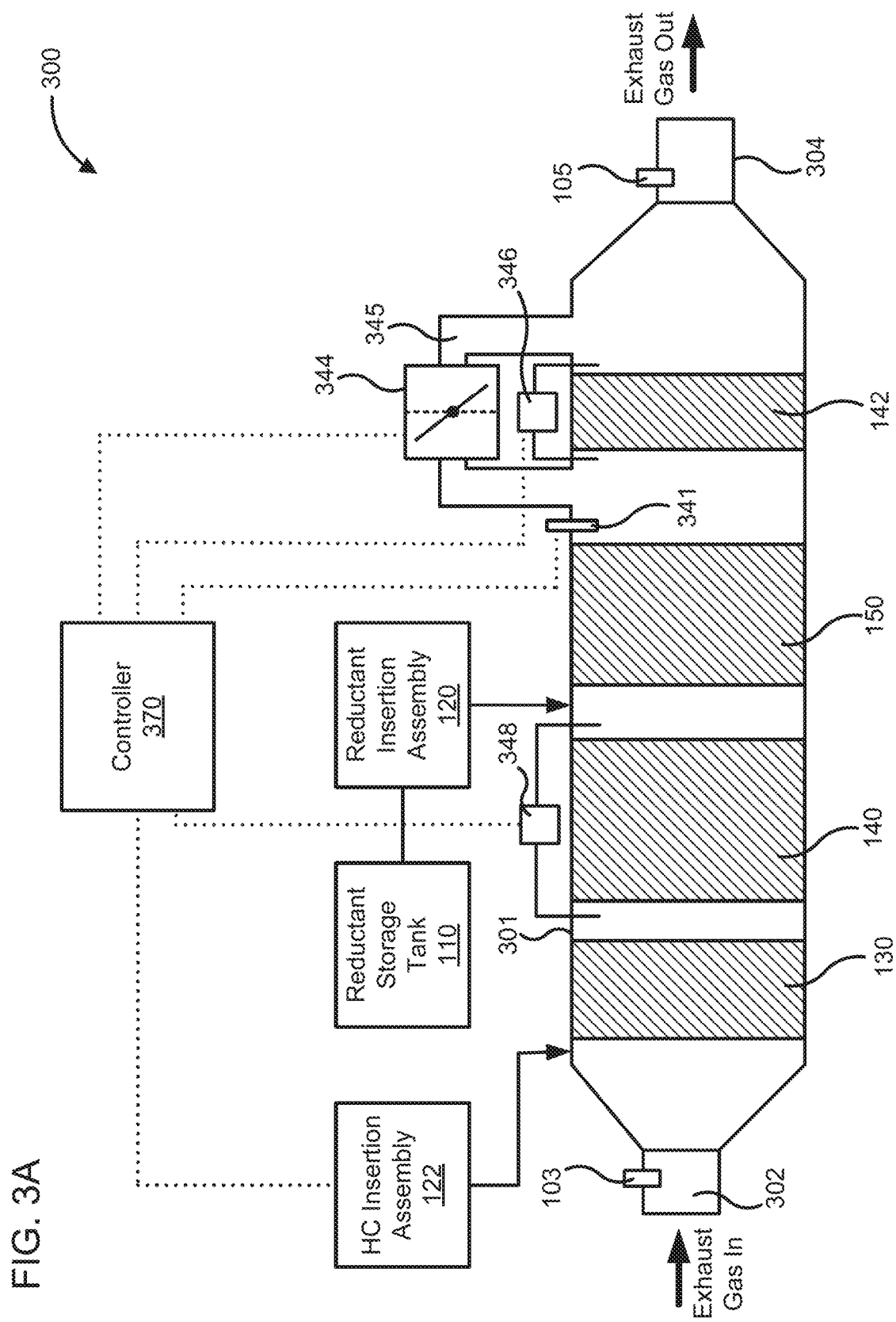
FIG. 3A is a schematic block diagram of an aftertreatment system, according to another embodiment.

In other embodiments, the aftertreatment system 100 may also include a bypass conduit (not shown) such as the bypass conduit 345 described with respect to FIG. 3A, fluidly coupling an exhaust gas flow path of the exhaust gas downstream of the first filter 140 and upstream of the second filter 142 to an exhaust gas flow path downstream of the second filter 142. A pressure activated valve may be disposed in the bypass conduit and may be configured to open in response to a pressure of the exhaust gas exceeding a predetermined pressure threshold, for example, due to the porosity of the second filter 142 dropping too low, as previously described herein. The pressure activated valve may close again after the second filter is regenerated, and the cycle is repeated.

FIG. 3A is a schematic illustration of an aftertreatment system 300, according to yet another embodiment. The aftertreatment system 300 is configured to receive an exhaust gas from an engine (e.g., a diesel engine, a gasoline engine, a natural gas engine, a dual fuel engine, a biodiesel engine, an E-85 engine, or any other suitable engine) and reduce constituents of the exhaust gas such as, for example, NOx gases, CO, hydrocarbons, etc. The aftertreatment system 300 may comprise the reductant storage tank 110, the reductant insertion assembly 120, a housing 301, the first filter 140, the second filter 142 and the SCR system 150, as previously described herein with respect to the aftertreatment system 100.

The housing 301 defines an internal volume within which the components of the aftertreatment system 300, i.e., the first filter 140, the second filter 142 and the SCR system 150 are positioned, as previously described herein. An inlet conduit 302 is fluidly coupled to an inlet of the housing 101 and structured to receive exhaust gas from the engine and communicate the exhaust gas to an internal volume defined by the housing 301. Furthermore, an outlet conduit 304 may be coupled to an outlet of the housing 301 and structured to expel treated exhaust gas into the environment (e.g., treated to remove PM such as soot and ash by the first and/or second filters 140 and 142 and/or reduce constituents of the exhaust gas such as NOx gases included in the exhaust gas). The first sensor 103 may be positioned in the inlet conduit 302 and the second sensor 105 may be positioned in the outlet conduit 304, as previously described herein with respect to the aftertreatment system 100.

In some embodiments, the aftertreatment system 300 may also include the oxidation catalyst 130 (e.g., a diesel oxidation catalyst) disposed upstream of the first filter 140, for example, in the housing 301. The hydrocarbon insertion assembly 122 may be configured to insert hydrocarbons (e.g., fuel such as diesel) into the exhaust gas upstream of or on the oxidation catalyst 130 to a raise a temperature of the exhaust gas, for example, for regenerating the first filter 140 and/or the second filter 142.

The first filter 140 is disposed upstream of the SCR system 150 and the second filter 142 is disposed downstream of the first filter 140, for example, downstream of the SCR system 150 as shown in FIG. 3A. For example, insertion of the reductant into the SCR system 150 may result in significant amount of solid particles (e.g., reductant particles, soot, ash, etc.) being present in the exhaust gas downstream of the SCR system 150, and positioning the second filter 142 downstream of the SCR system 150 may allow capture of such particles downstream of the SCR system 150. In other embodiments, the second filter 142 may be disposed upstream of the SCR system 150. A pressure sensor 346 (e.g., a differential or delta pressure sensor) is operatively coupled to the second filter 142 and is configured to determine a pressure drop across the second filter 142. The pressure drop may indicate a degree of clogging of the second filter 142. The first filter 140 and the second filter 142 have the same structure and function as described with respect to the aftertreatment system 100.

The aftertreatment system 300 also comprises a bypass conduit 345 fluidly coupling an exhaust gas flow path of the exhaust gas downstream of the first filter 140 and upstream of the second filter 142 to an exhaust gas flow path downstream of the second filter 142. For example, the bypass conduit 345 may fluidly a couple a volume of the housing 301 located between the SCR system 150 and the second filter 142 to a volume of the housing 301 downstream of the second filter 142. The bypass conduit 345 therefore provides a bypass flow path for the exhaust gas to bypass the second filter 142.

A valve 344 is operatively coupled to the bypass conduit 345. The valve 344 may include a butterfly valve, a rotation valve, a diaphragm valve, a needle valve, a pinch valve, a check valve or any other suitable valve. The valve 344 is moveable between a closed position in which the exhaust gas flows through the second filter 142, and an open position in which at least a portion of the exhaust gas flows through the bypass conduit 345 so as to bypass the second filter 142. In various embodiments, a degree of opening of the valve 344 may be adjusted to control an amount of exhaust gas flowing through the second filter 142 and the amount of exhaust gas bypassing the second filter 142. For example, the valve 344 may be initially closed when the first filter 140 is new or is recently regenerated to cause the exhaust gas to flow through the second filter 142 and provide high filtration efficiency. Over time, the first filter 140 gets increasingly clogged with PM and experiences an increase in its first filtration efficiency. Furthermore, the second filter 142 also gets increasingly clogged as previously described herein with respect to the aftertreatment system 100 causing an increasing in backpressure on the exhaust gas which may reduce fuel economy of the engine producing the exhaust gas. The valve 344 may therefore, be increasingly opened to cause at least a portion of the exhaust gas to bypass the second filter 142 through the bypass conduit 345 so as to reduce a back pressure on the exhaust gas. The valve 344 may be completely opened once a first filtration efficiency of the first filter 140 has reached a first filtration efficiency threshold corresponding to a desired filtration efficiency from the aftertreatment system 300 and/or a pressure drop across the second filter 142 is greater than a pressure drop threshold.

Figure 3B:
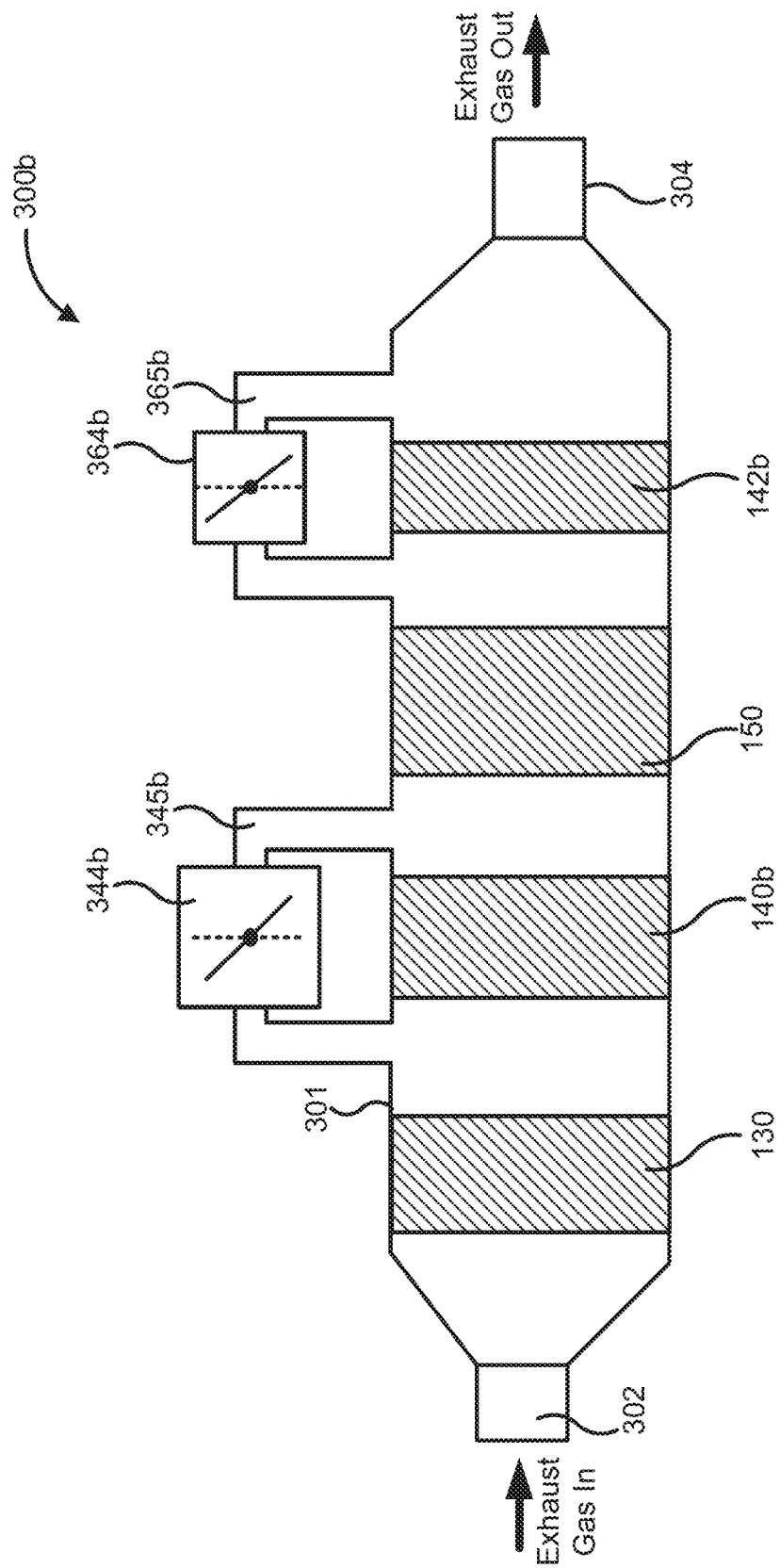
FIG. 3B is a schematic block diagram of an aftertreatment system, according to another embodiment.

While FIG. 3A shows the bypass conduit and the small pore size second filter 142 positioned downstream of the larger pore size first filter 140, in other embodiments, a bypass conduit may be positioned across the upstream, filter alternatively, or additionally to the bypass conduit positioned around the downstream filter. For example, FIG. 3B is a schematic block diagram of an aftertreatment system 300b, according to another embodiment. The aftertreatment system 300b is similar to the aftertreatment system 300 with the following differences.

The aftertreatment system 300b includes a first filter 140b and a second filter 142b positioned downstream of the first filter 140b. A first bypass conduit 345b fluidly couples an exhaust gas flow path upstream of the first filter 140b to an exhaust gas flow path between the first filter 140b and the second filter 142b. A first bypass conduit 345b is operably coupled to the first bypass valve 344b. Furthermore, a second bypass conduit 365b fluidly couples an exhaust gas flow path between the first filter 140b and the second filter 142b, to an exhaust gas flow path downstream of the second filter 142b. The first valve 344b and the second valve 364b may be selectively opened or closed to cause a larger portion of the exhaust gas to flow through the first filter 140b (first valve 344b closed and second valve 364b open), a larger portion of the exhaust gas to flow through the second filter 142b (first valve 344b open and second valve 364b closed) or the exhaust gas to flow through each of the filters 140b and 142b (both valve 344b and 364b closed).

In some embodiments, the first filter 140b may have a smaller pore size and therefore, a higher filtration efficiency than the second filter 142b. In such embodiments, the second bypass conduit 365b may be excluded such that a degree of opening of the first valve 344b may be controlled to provide high fuel economy or high filtration efficiency, as described herein. Furthermore, the first filter 140b may have a smaller diameter than the second filter 142b. In other embodiments, the second filter 142b may have a higher filtration efficiency than the first filter 140b to provide high filtration efficiency or fuel economy, as previously described with respect to FIG. 3A.

Referring again to FIG. 3A, a controller 370 may be operatively coupled to the valve 344 and configured to move the valve 344 into an open position, a closed position or control a degree of opening of the valve 344 so as to a control a ratio of the exhaust gas flowing through the second filter 142 or the bypass conduit 345. In some embodiments, the controller 370 may also be communicatively coupled to the first sensor 103, the second sensor 105 and/or the pressure sensor 346. In some embodiments, the controller 370 may also be communicatively coupled to the engine and configured to determine one or more engine operating parameters (e.g., engine speed, engine torque, exhaust gas flow rate, fuel insertion rate, intake air flow rate, etc.) associated with the engine. The controller 370 may be operatively coupled to these components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

In some embodiments, the controller 370 may be configured to determine an operating condition of the engine. For example, the controller 370 may be configured to receive an engine signal from the engine, a first sensor signal from the first sensor 103 and/or a second sensor signal from the second sensor 105 to determine an operating condition of the engine, for example, is the engine operating under a high PM operating condition in which a higher amount of PM is included in the exhaust gas emitted by the engine (e.g., during high engine load conditions) or a low PM operating condition in which a lower PM is included in the exhaust gas relative to the high PM operating condition (e.g., operating under steady state or low load conditions).

The controller 370 is configured to control the valve 344 such that the valve 344 is more closed during the high particulate matter operating condition of the engine than during the low particulate matter operating condition of the engine, such that a larger portion of the exhaust gas flows through the second filter 142 during the high particulate matter operating condition of the engine than during the low particulate matter operating condition of the engine. For example, in response to the engine operating under a high PM operating condition, the controller 370 may be configured to cause the valve 344 to open a first predetermined amount such that the valve 344 is more closed than open so as to cause a larger portion of the exhaust gas to flow through the second filter 142 than the bypass conduit 345 and provide high filtration efficiency. When the engine is operating under the high PM operating condition, the controller 370 may completely close the valve 344 or open the valve 344 a small degree to cause a larger portion of the exhaust gas to flow through the second filter 142 than the bypass conduit 345. The second filter 142 increases the filtration efficiency, as previously described herein. In some embodiments, the high PM operating condition corresponds to a larger amount of reductant being inserted into the SCR system 150 relative to the low PM operating condition.

In contrast, in response to the engine operating under a low PM operating condition, the controller 370 may be configured to cause the valve 344 to open a second predetermined amount such that the valve 344 is more open than closed so as to cause a larger portion of the exhaust gas to flow through the bypass conduit 345 and provide high fuel economy. For example, when the engine is operating under the low PM operating condition, the controller 370 may be configured to open the valve 344 a larger degree or completely open the valve 344 so as to cause a larger portion or substantially all of the exhaust gas to bypass the second filter 142 via the bypass conduit 345. As previously described herein, as the second filter 142 becomes increasingly clogged, a backpressure on the exhaust gas increases which reduces fuel economy. If the filtration efficiency desired from the aftertreatment system 300 is being met (e.g., due to the first filter 140 reaching the first filtration efficiency threshold), then allowing a larger portion of the exhaust gas to bypass the second filter 142 reduces the backpressure on the exhaust gas and increases fuel economy. The valve 345 is controlled that the exhaust gas expelled into the environment from the aftertreatment system 300 has a PM count which is lower than a predetermined threshold, for example, to meet an emission standard. Thus, regardless of the high PM or low PM operating condition, the controller 370 is configured to ensure that the exhaust gas emitted from the aftertreatment system 300 meets a desired emission standard.

In some embodiments, the controller 370 may be configured to determine an operating condition of the aftertreatment system 300 (e.g., a pressure drop across the first filter 140, a filtration efficiency of the first filter 140, a pressure drop across the second filter 142, a flow rate and/or temperature of the exhaust gas) and open or close the valve 344 based on the operating condition of the aftertreatment system 300.

The controller 370 may be configured to determine whether a first filtration efficiency of the first filter 140 is less than or equal to a first filtration efficiency threshold or greater than the first filtration efficiency threshold. The controller 370 is configured to control the valve 344 such that the valve 344 is more closed when the first filtration efficiency is less than or equal to the first filtration efficiency threshold than when the first filtration efficiency is greater than the first filtration efficiency threshold, such that a larger portion of the exhaust gas flows through the second filter 142 when the first filtration efficiency is less than the first filtration efficiency threshold. For example, the valve 344 may be initially in the closed position when the first filtration efficiency is less than or equal to the first filtration efficiency threshold such that substantially all of the exhaust gas flows through the second filter 142. In response to the first filtration efficiency being greater than a first filtration efficiency threshold, the controller 370 increasingly opens the valve 344 so that the valve is less closed relative to when the first filtration efficiency is less than or equal to the first filtration efficiency threshold and more of the exhaust gas flows through the bypass conduit 345 than the second filter 142.

Expanding further, in some embodiments, the controller 370 is configured to determine a first filtration efficiency of the first filter 140. If the first filtration efficiency is less than a first filtration efficiency threshold, the controller 370 closes the valve 344 to cause the exhaust gas to flow through the second filter 142 so as to provide high filtration efficiency. In response to the first filtration efficiency being equal to or greater than the first filtration efficiency threshold, the controller 370 may increase opening of the valve 344 (e.g., completely open the valve 344) such that at least a portion of the exhaust gas bypasses the second filter 142 via the bypass conduit 345. As previously described herein, the valve 345 is controlled that the exhaust gas expelled into the environment from the aftertreatment system 300 has a PM count which is lower than a predetermined threshold, for example, to meet the emission standard.

In some embodiments, the controller 370 may be configured to determine a first pressure drop across the first filter 140. For example, a first pressure sensor 348 may be operatively coupled to the first filter 140 and configured to determine a pressure drop across the first filter 140. The controller 370 may be operatively coupled to the first pressure sensor 348 and configured to determine a first pressure drop thereacross. The controller 370 may also be configured to determine a flow rate of the exhaust gas. The controller 370 may be configured to determine a first filtration efficiency of the first filter 140 based on the first pressure drop and the flow rate of the exhaust gas, for example, a ratio between the pressure drop (e.g., differential pressure) and the flow rate.

Figure 5:
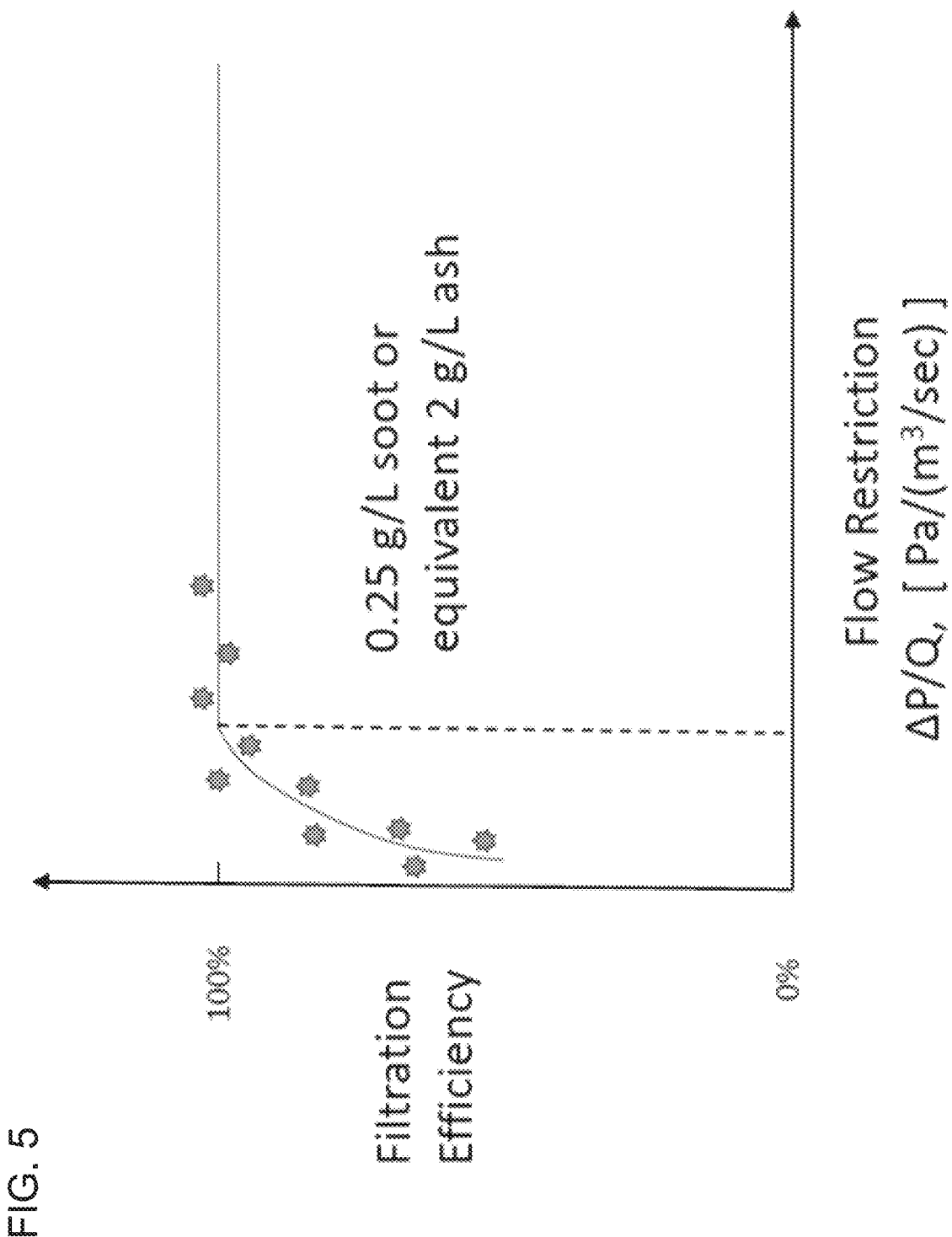
FIG. 5 is a plot of a filter flow restriction vs filtration efficiency for an example filter.

For example, FIG. 5 shows a plot of filtration efficiency of a first filter vs. a flow restriction (i.e., a ratio of pressure drop across the first filter and a flow rate of the exhaust gas) across the first filter, according to a specific embodiment. As exhaust gas continues to flow through the first filter 140, a PM load, for example, a soot load or an ash load on the first filter 140 continues to increase causing a corresponding increase in the filtration efficiency of the first filter (e.g., the first filter 140) until the first filtration efficiency reaches a first filtration efficiency threshold (e.g., greater than 95% filtration efficiency). In some embodiments, the first filtration efficiency threshold corresponds to a ash load of 0.1-10 g/L on the first filter 140 for a mileage of the engine producing the exhaust of less than 5,000 miles. For example, as shown in FIG. 5, for a particular first filter, the first filtration efficiency threshold corresponds to a 0.25 g/L soot load or equivalent 2 g/L ash load on the first filter, at which the first filtration efficiency is close to 100%. It should be appreciated that in other embodiments, the first filtration efficiency threshold may be different depending on the particular first filter used in the aftertreatment system 300.

In some embodiments, the controller 370 may also be configured to determine a pressure drop across the second filter 142. For example, the controller 370 may receive a pressure signal from the pressure sensor 346 and determine the pressure drop across the second filter 142 therefrom. In response to the pressure drop being greater than a predetermined pressure drop threshold, the controller 370 may be configured to open the valve 344 so as to allow at least a portion of the exhaust gas to bypass the second filter 142 via the bypass conduit 345. For example, the pressure drop across the second filter 142 being greater than a predetermined pressure drop threshold may correspond to a high backpressure on the exhaust gas which reduces fuel economy below a fuel economy threshold. Thus, the controller 370 opens the valve 344 so as to allow at least a portion of the exhaust gas to bypass the second filter 142 and reduce back pressure on the exhaust gas. In some embodiments, the controller 370 may be configured to open the valve 344 if the second filter 142 is difficult to regenerate or a temperature of the exhaust gas reaching the second filter 142 is below a predetermined temperature threshold which may correspond to the pressure drop across the second filter 142 being greater than the predetermined pressure drop threshold.

In some embodiments, the controller 370 may also be configured to determine a temperature of the exhaust gas proximate to an inlet of the second filter 142. For example, the controller 370 may be communicatively coupled to a temperature sensor 341 positioned upstream of the second filter 142 and receive a temperature signal therefrom corresponding to a temperature of the exhaust gas at the inlet of the second filter 142. In response to the temperature of the exhaust gas being above the predetermined temperature threshold, the controller 370 may be configured to close the valve 344 so as to force hot exhaust gas to flow through the second filter 142 for regenerating the second filter 142. In some embodiments, the controller 370 may also be communicatively coupled to the hydrocarbon insertion assembly 122 and configured to instruct the hydrocarbon insertion assembly 122 to insert hydrocarbons into the oxidation catalyst 130 for raising the temperature of the exhaust gas above the predetermined temperature threshold, for example, for regenerating the first filter 140 and/or the second filter 142.

Figure 4:
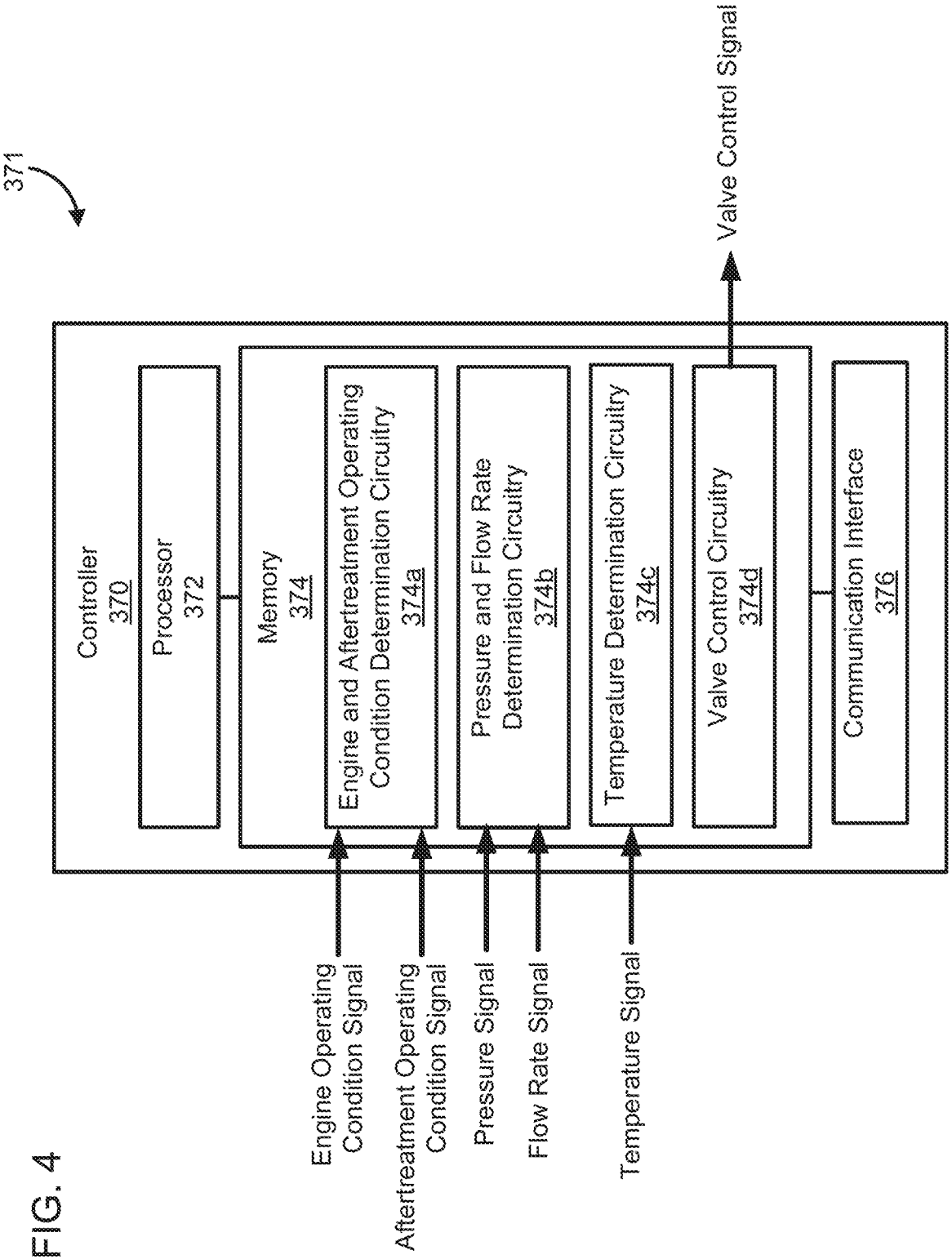
FIG. 4 is a schematic block diagram of an embodiment of a control circuitry that may be included in the aftertreatment system of FIG. 3A or 3B.

In particular embodiments, the controller 370 may be included in a control circuitry. For example, FIG. 4 is a schematic block diagram of a control circuitry 371 that comprises the controller 370, according to an embodiment. The controller 370 comprises a processor 372, a memory 374, or any other computer readable medium, and a communication interface 376. Furthermore, the controller 370 includes an engine operating condition determination circuitry 374a, a pressure and flow rate determination circuitry 374b, a temperature determination circuitry 374c and a valve control circuitry 374d. It should be understood that the controller 370 shows only one embodiment of the controller 370 and any other controller capable of performing the operations described herein can be used.

The processor 372 can comprise a microprocessor, programmable logic controller (PLC) chip, an ASIC chip, or any other suitable processor. The processor 372 is in communication with the memory 374 and configured to execute instructions, algorithms, commands, or otherwise programs stored in the memory 374.

The memory 374 comprises any of the memory and/or storage components discussed herein. For example, memory 374 may comprise a RAM and/or cache of processor 372. The memory 374 may also comprise one or more storage devices (e.g., hard drives, flash drives, computer readable media, etc.) either local or remote to controller 370. The memory 374 is configured to store look up tables, algorithms, or instructions.

In one configuration, the engine operating condition determination circuitry 374a, the pressure and flow rate determination circuitry 374b, the temperature determination circuitry 374c and the valve control circuitry 374d are embodied as machine or computer-readable media (e.g., stored in the memory 374) that is executable by a processor, such as the processor 372. As described herein and amongst other uses, the machine-readable media (e.g., the memory 374) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine operating condition determination circuitry 374a, the pressure and flow rate determination circuitry 374b, the temperature determination circuitry 374c and the valve control circuitry 374d are embodied as hardware units, such as electronic control units. As such, the engine operating condition determination circuitry 374a, the pressure and flow rate determination circuitry 374b, the temperature determination circuitry 374c and the valve control circuitry 374d may be embodied as one or more circuitry components including, but not limited to, processing circuitry, network interfaces, peripheral devices, input devices, output devices, sensors, etc.

In some embodiments, the engine operating condition determination circuitry 374a, the pressure and flow rate determination circuitry 374b, the temperature determination circuitry 374c and the valve control circuitry 374d may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine operating condition determination circuitry 374a, the pressure and flow rate determination circuitry 374b, the temperature determination circuitry 374c and the valve control circuitry 374d may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the engine operating condition determination circuitry 374a, the pressure and flow rate determination circuitry 374b, the temperature determination circuitry 374c and the valve control circuitry 374d may also include programmable hardware devices such as field programmable gate arrays, programmable array logic, programmable logic devices or the like. In this regard, the engine operating condition determination circuitry 374a, the pressure and flow rate determination circuitry 374b, the temperature determination circuitry 374c and the valve control circuitry 374d may include one or more memory devices for storing instructions that are executable by the processor(s) of the engine operating condition determination circuitry 374a, the pressure and flow rate determination circuitry 374b, the temperature determination circuitry 374c and the valve control circuitry 374d. The one or more memory devices and processor(s) may have the same definition as provided below with respect to the memory 374 and the processor 372.

In the example shown, the controller 370 includes the processor 372 and the memory 374. The processor 372 and the memory 374 may be structured or configured to execute or implement the instructions, commands, and/or control processes described herein with respect the engine operating condition determination circuitry 374a, the pressure and flow rate determination circuitry 374b, the temperature determination circuitry 374c and the valve control circuitry 374d. Thus, the depicted configuration represents the aforementioned arrangement where the engine operating condition determination circuitry 374a, the pressure and flow rate determination circuitry 374b, the temperature determination circuitry 374c and the valve control circuitry 374d are embodied as machine or computer-readable media. However, as mentioned above, this illustration is not meant to be limiting as the present disclosure contemplates other embodiments such as the aforementioned embodiment where the engine operating condition determination circuitry 374a, the pressure and flow rate determination circuitry 374b, the temperature determination circuitry 374c and the valve control circuitry 374d, or at least one circuit of the engine operating condition determination circuitry 374a, the pressure and flow rate determination circuitry 374b, the temperature determination circuitry 374c and the valve control circuitry 374d are configured as a hardware unit. All such combinations and variations are intended to fall within the scope of the present disclosure.

The processor 372 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the engine operating condition determination circuitry 374a, the pressure and flow rate determination circuitry 374b, the temperature determination circuitry 374c and the valve control circuitry 374d) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 374 (e.g., RAM, ROM, Flash Memory, hard disk storage, etc.) may store data and/or computer code for facilitating the various processes described herein. The memory 374 may be communicably connected to the processor 372 to provide computer code or instructions to the processor 372 for executing at least some of the processes described herein. Moreover, the memory 374 may be or include tangible, non-transient volatile memory or non-volatile memory. Accordingly, the memory 374 may include database components, object code components, script components, or any other type of information structure for supporting the various activities and information structures described herein.

The communication interface 376 may include wireless interfaces (e.g., jacks, antennas, transmitters, receivers, communication interfaces, wire terminals, etc.) for conducting data communications with various systems, devices, or networks. For example, the communication interface 376 may include an Ethernet card and port for sending and receiving data via an Ethernet-based communications network and/or a Wi-Fi communication interface for communicating with, for example, the first sensor 103, the second sensor 105, the engine, the valve 344, the pressure sensor 346, the first pressure sensor 348, the hydrocarbon insertion assembly 122 and/or any other component of the aftertreatment system 300. The communication interface 376 may be structured to communicate via local area networks or wide area networks (e.g., the Internet, etc.) and may use a variety of communications protocols (e.g., IP, LON, Bluetooth, ZigBee, radio, cellular, near field communication, etc.).

The engine operating condition determination circuitry 374a may be configured to receive an engine operating condition signal, for example, from the engine, the first and/or second sensors 103 and 105 or any other sensor and determine if the engine is operating under a high PM operating condition or a low PM operating condition. Furthermore, the engine operating condition determination circuitry 374a may also be configured to determine an aftertreatment operating condition signal, for example, from the pressure sensors 346 and/or 348, from the temperature sensor 341, the first sensor 103 and/or the second sensor 105.

The valve control circuitry 374d is configured to generate a valve signal configured to open the valve 344, close the valve 344 or adjust a degree of opening of the valve 344, as previously described herein. In response to the engine operating under the high PM operating condition, the valve control circuitry 374d may be configured to cause the valve 344 to open the first predetermined amount such that the valve 344 is more closed than open or completely close the valve 344 to increase a filtration efficiency of the aftertreatment system 300, as previously described herein. Furthermore, in response to the engine operating under the low PM operating condition, the valve control circuitry 374d may be configured to cause the valve 344 to open the second predetermined amount such that the valve 344 is more open than closed or completely open the valve 344 to increase a fuel economy of the engine, as previously described herein.

The pressure and flow rate determination circuitry 374b is configured to determine a first pressure drop across the first filter 140 (e.g., from a pressure signal received from the first pressure sensor 348) and determine a flow rate of the exhaust gas (e.g., from a flow rate signal received from a flow rate sensor or based on one or more engine operating conditions). The pressure and flow rate determination circuitry 374b may determine a first filtration efficiency of the first filter 140 based on the first pressure drop and the exhaust gas flow rate (e.g., a ratio of the pressure drop to the exhaust gas flow rate). In response to the first filtration efficiency being equal to or greater than the first filtration efficiency threshold, the valve control circuitry 374d may increase opening of the valve 344 or otherwise completely open the valve 344.

In some embodiments, the pressure and flow rate determination circuitry 374b may also be configured to determine a pressure drop across the second filter 142 (e.g., from a pressure signal received from the pressure sensor 346). In response to the pressure drop across the second filter 142 being greater than a predetermined pressure drop threshold, the valve control circuitry 374d may be configured to open the valve 344 so as to allow at least a portion of the exhaust gas to bypass the second filter 142, as previously described herein.

The temperature determination circuitry 374c may be configured to determine a temperature of the exhaust gas proximate to the inlet of the second filter 142 (e.g., from a temperature signal received from the temperature sensor 341). In response, to the temperature of the exhaust gas being above the predetermined temperature threshold, the valve control circuitry 374d may be configured to close the valve 344 (e.g., by the second predetermined amount or completely close the valve 344) so as to force hot exhaust gas to flow through the second filter 142 for regenerating the second filter 142, as previously described herein. In some embodiments, the temperature determination circuitry 374c may also be configured to instruct the hydrocarbon insertion assembly 122 to insert hydrocarbons into the oxidation catalyst 130 or the exhaust gas to raise a temperature of the exhaust gas to the predetermined temperature threshold for regenerating the first and/or second filters 140 and 142.

Figure 6:
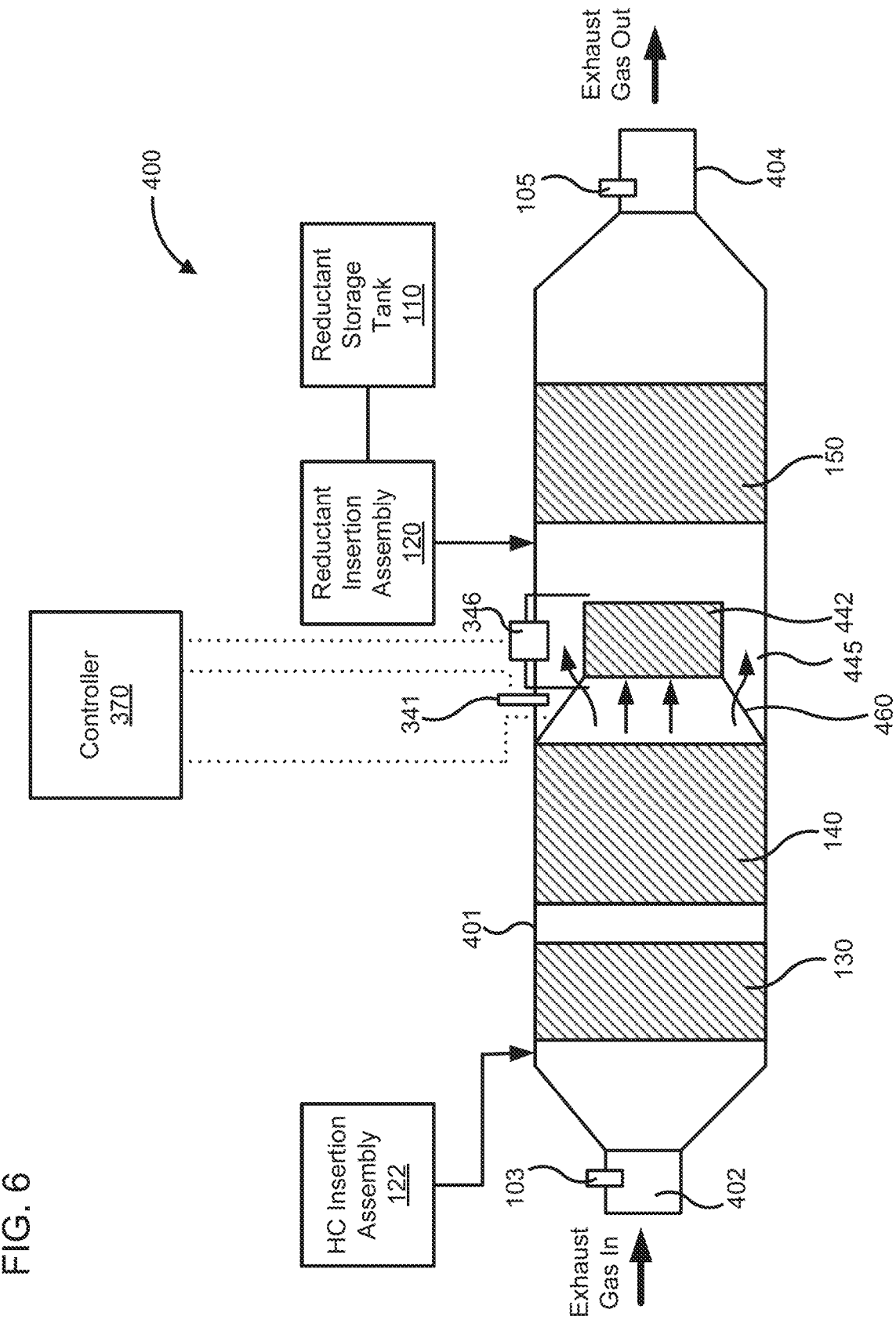
FIG. 6 is a schematic illustration of an aftertreatment system, according to yet another embodiment.

FIG. 6 is a schematic illustration of an aftertreatment system 400, according to another embodiment. The aftertreatment system 400 is configured to receive an exhaust gas from an engine (e.g., a diesel engine, a gasoline engine, a natural gas engine, a dual fuel engine, a biodiesel engine, an E-85 engine, or any other suitable engine) and reduce constituents of the exhaust gas such as, for example, NOx gases, CO, hydrocarbons, etc. The aftertreatment system 400 may comprise the reductant storage tank 110, the reductant insertion assembly 120, a housing 401, the first filter 140, a second filter 442 disposed downstream of the first filter 140, the SCR system 150 disposed downstream of the second filter 442, and the controller 370 as previously described herein with respect to the aftertreatment system 100, 300. In other embodiments, the second filter 442 may be disposed downstream of the SCR system 150. In some embodiments, the aftertreatment system 400 may also include the oxidation catalyst 130 disposed upstream of the first filter 140, and the hydrocarbon insertion assembly 122 for selectively inserting hydrocarbons into the exhaust gas, as previously described herein.

The housing 401 includes an inlet conduit 402 having the first sensor 103 disposed therein, and an outlet conduit 404 having the second sensor 105 disposed therein. The second filter 442 may have a smaller diameter than the first filter 140 or otherwise a diameter of the housing 401 such that a bypass conduit 445 is defined around the second filter 442 between an outer radial surface of the second filter 442 and an inner radial surface of the housing 401. The second filter 442 may have a smaller pore size and, thereby a higher filtration efficiency than the first filter 140, and may be similar in function to the second filter 142, as previously described herein. The pressure sensor 346 may be operatively coupled to the second filter 442 and configured to determine a pressure drop across the second filter 442. Furthermore, the temperature sensor 341 may be positioned upstream of the second filter 442 and configured to determine a temperature of the exhaust gas entering the second filter 442.

A valve 460 is disposed at an inlet of bypass conduit 445 between the inner surface of the housing 401 and an outer surface of the second filter 442. The valve 460 is configured to be selectively opened to control an amount of exhaust gas flowing through the second filter 442 and/or around the second filter 442 through the bypass conduit 445. For example, the controller 370 may be operatively coupled to the valve 460 and configured to open the valve 460, close the valve 460 or open the valve 460 a predetermined amount, for example, to control an amount of the exhaust gas flowing through the second filter 442 and through the bypass conduit 445, as previously described herein.

Figure 7A:
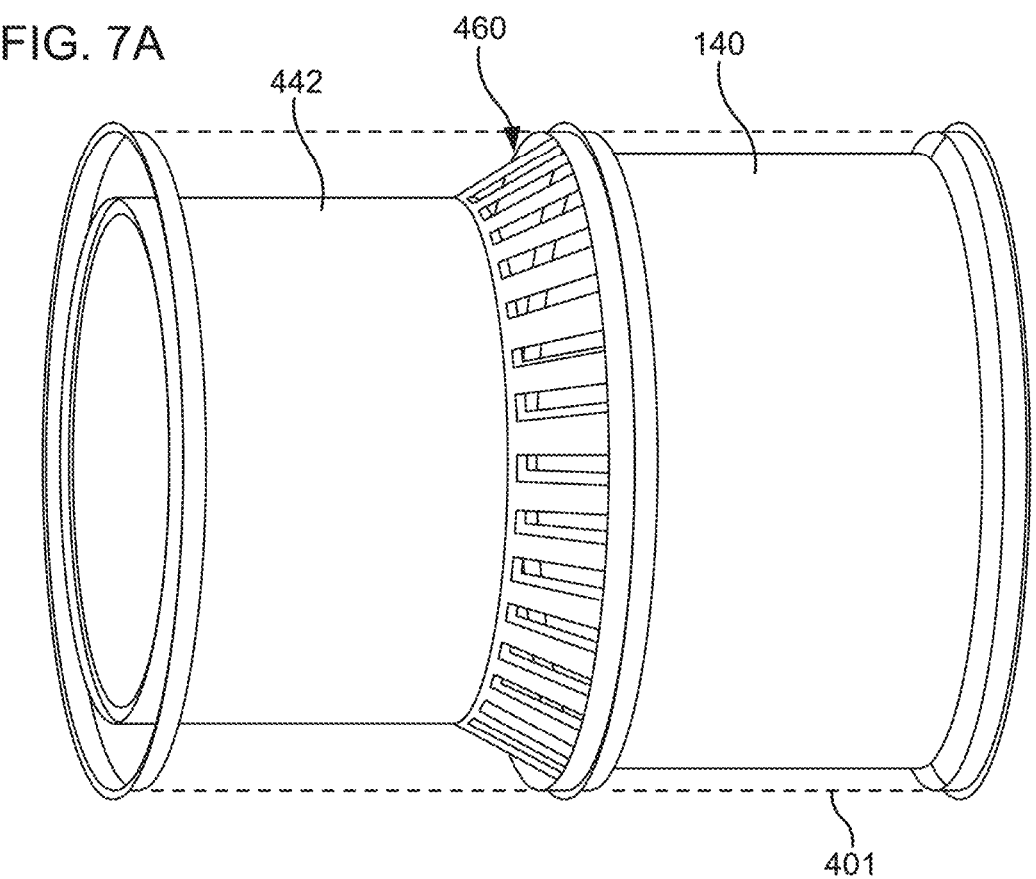
FIG. 7A is a side perspective view of a portion of an aftertreatment system showing a first filter, a second filter and a bypass conduit, according to an embodiment.
Figure 7B:
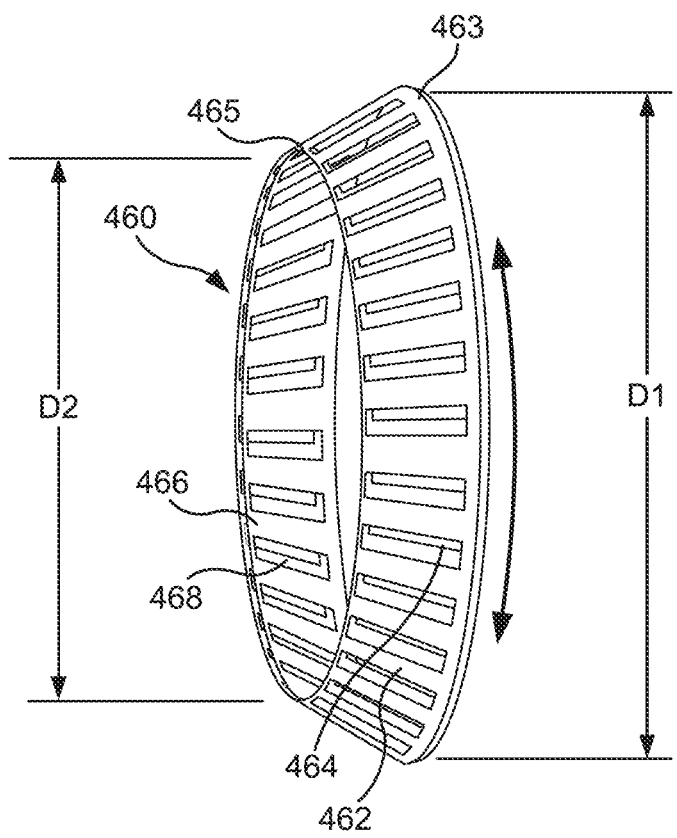
FIG. 7B is a side perspective view of a valve disposed in the bypass conduit of the aftertreatment system of FIG. 7A.
Figure 8A:
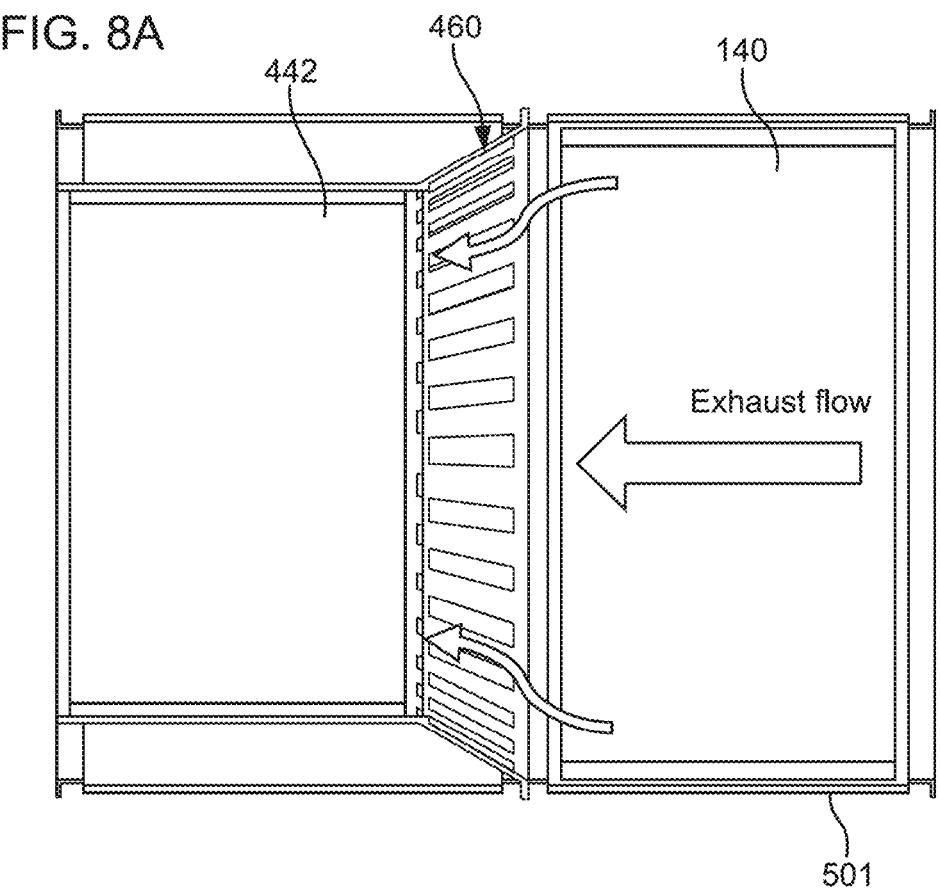
FIG. 8A is a side view of the portion of the aftertreatment system of FIG. 7A with the valve being in a closed position.
Figure 8B:
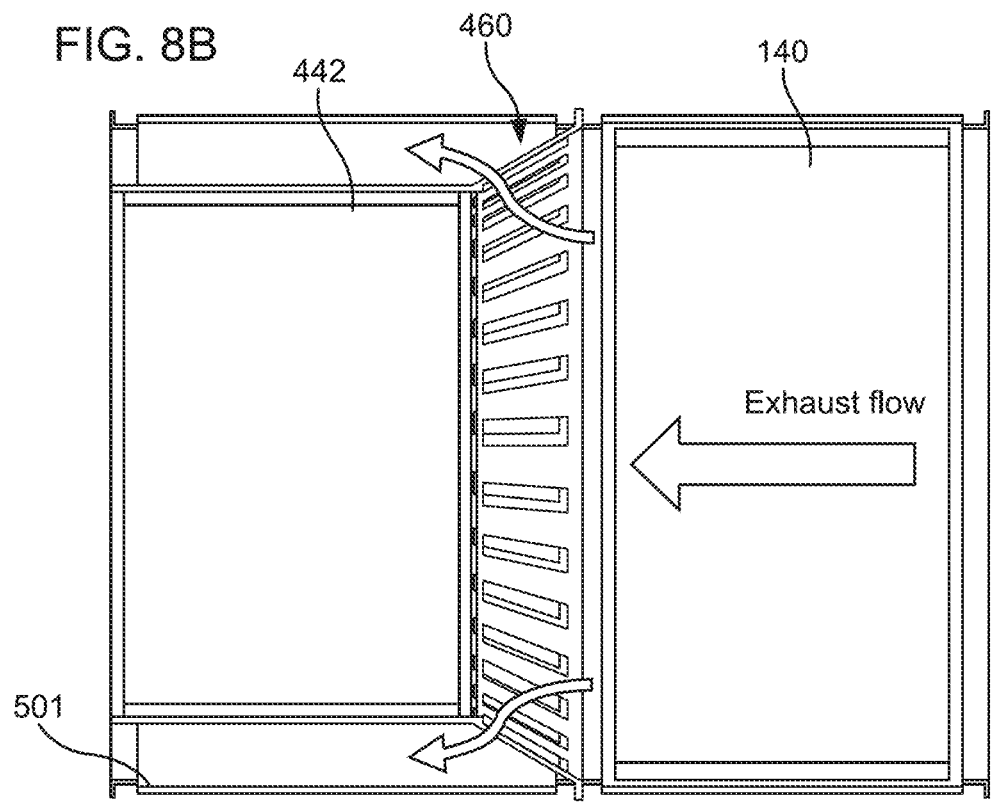
FIG. 8B shows the valve in an open position.

In some embodiments, the valve 460 may include a ring type valve. Referring also now to FIGS. 7A-7B and 8A-8B, a portion of the housing 401 is shown that includes the first filter 140, the second filter 442 and the valve 460 positioned therebetween. As shown in FIG. 7B, the valve 460 includes a plurality of rings including a first ring 462 defining a plurality of first openings 464, for example, a plurality of equally spaced slits defined through the first ring 462. The first ring 462 defines a first diameter D1 at a first end 463 thereof proximate to an outlet of the first filter 140 and a second diameter D2 at a second end 465 thereof proximate to an inlet of the second filter 442 which is smaller than the first diameter D1. The second diameter D2 may be approximately equal to an outer diameter of the second filter 442. The first end 463 may be coupled to an inner surface of the housing 401 and/or an outer surface of the first filter 140, for example, to prevent leakage of the exhaust gas therethrough between the housing 401 and the first end 463. Furthermore, the second end 465 may be coupled to the inlet of the second filter 442, for example, to prevent leakage of the exhaust gas between the second end 465 and the second filter 442. In various embodiments, the first ring 462 may be immovably disposed in the housing 401.

The valve 460 also comprises a second ring 466 defining a plurality of second openings 468, for example, a plurality of equally spaced slits defined through the second ring 466. The second ring 466 abuts the first ring 462 and is axially aligned therewith. The second ring 466 may be substantially similar to the first ring 462 in size and shape. Furthermore, a radial spacing between the plurality of first openings 464 and the plurality of second openings 468 may be approximately equal to each other.

The second ring 466 maybe rotatable relative to the first ring 462, for example, in a scissor like motion, such that in a closed position of the valve 460 (FIG. 8A), the plurality of first openings 464 are misaligned with the plurality of second openings 468 such that the exhaust gas flows through the second filter 442. In the open position shown in FIG. 8B, the second ring 466 is rotated relative to the first ring 462 to move the valve 460 into the open position in which the plurality of first openings 464 are aligned with the plurality of second openings 468 such that a flow path is defined therethrough. More of the exhaust gas flows through the second filter 442 when the valve 460 is in the closed position than when the valve 460 is in the open position. In some embodiments, at least a portion of the exhaust gas flows through the plurality of first and second openings 464 and 468 and through the bypass conduit 445 around the second filter 442 in the open position of the valve 460, thereby bypassing the second filter 442. In various embodiments, an external rotational actuator with a cam may be used to provide six degrees of rotation to the second ring 466 relative to the first ring 462 for opening or closing of the valve 460. The second ring 466 may be variably rotated relative to the first ring 462 to control the amount of exhaust gas flowing through the second filter 442 vs. the bypass conduit 445.

While shown as including the first ring 462 and the second ring 466, in other embodiments, the valve 460 may include more than two rings, for example, three rings or four rings each having predetermined space therebetween. With two rings, the valve 460 may have a 50% open frontal area. In a three ring arrangement, two of the rings may be rotatable relative to a third stationary and may be able to provide up to 66% open frontal area. Similarly, in a four ring arrangement, at least two of rings may be rotatable such that the valve may be able to provide up to 75% open frontal area.

Figure 9:
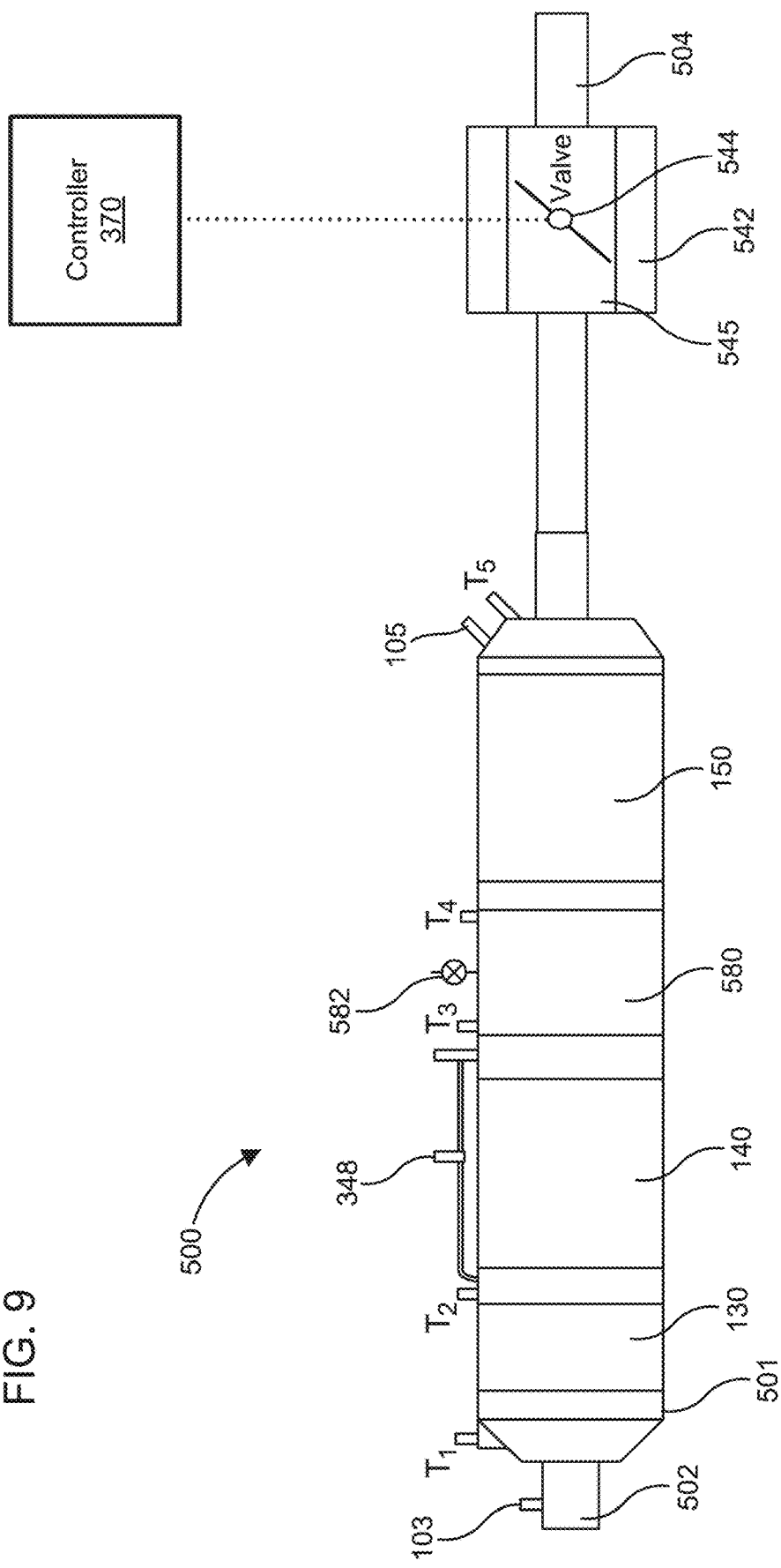
FIG. 9 is a schematic illustration of an aftertreatment system, according to still another embodiment.

FIG. 9 is a schematic illustration of an aftertreatment system 500, according to an embodiment. The aftertreatment system 500 is configured to receive an exhaust gas from an engine (e.g., a diesel engine, a gasoline engine, a natural gas engine, a dual fuel engine, a biodiesel engine, an E-85 engine, or any other suitable engine) and reduce constituents of the exhaust gas such as, for example, NOx gases, CO, hydrocarbons, etc. The aftertreatment system 500 may comprise a housing 501, the first filter 140, the SCR system 150 disposed downstream of the first filter 140, a second filter 542 disposed downstream of the SCR system 150, and the controller 370, as previously described herein with respect. In other embodiments, the second filter 442 may be disposed upstream of the SCR system 150 and downstream of the first filter 140. In some embodiments, the aftertreatment system 500 may also include the oxidation catalyst 130 disposed upstream of the first filter 140. Furthermore, an ammonia slip catalyst may be disposed downstream of the SCR system 150.

The housing 501 includes an inlet conduit 502 having the first sensor 103 disposed therein, and an outlet conduit 504 having the second sensor 105 disposed therein. A reductant injector 582 may be disposed upstream of the SCR system 150 and configured to insert reductant into the exhaust gas. In some embodiments, the aftertreatment system 500 may also include a mixer 580 disposed upstream of the SCR system 150 and configured to facilitate mixing of the reductant with the exhaust gas. A plurality of temperature sensors $T_1$, $T_2$, $T_3$, $T_4$ and $T_5$ may be disposed at various locations along the housing 501 and configured to measure the temperature of the exhaust gas at the respective locations. The first pressure sensor 348 may be operatively coupled to the first filter 140 and configured to determine a pressure drop thereacross, as previously described herein.

The second filter 542 is disposed downstream of the SCR system 150. The second filter 542 may have a smaller pore size and, therefore a higher filtration efficiency than the first filter 140, and may be similar in function to the second filter 142, 442. The second filter 542 defines a bypass conduit 545 therethrough, for example, through a longitudinal axis thereof. A valve 544 (e.g., a butterfly valve) is disposed in the bypass conduit 545 and moveable between an open position and a closed position. For example, the controller 370 may be configured to instruct the valve 544 to move into a closed position in response a high PM operating condition of the engine, when the first filtration efficiency of the first filter 140 is below the first filtration efficiency threshold and/or if a pressure drop across the second filter 542 is below a predetermined pressure drop threshold. In response to a low PM engine operating condition, or a first filtration efficiency of the first filter 140 reaching the first filtration efficiency threshold, the controller 370 may be configured to open the valve 544 causing at least a portion of the exhaust gas to flow through the bypass conduit 545 defined through the second filter 542 so as to reduce back pressure on the exhaust gas and increase fuel economy, as previously described herein.

Figure 10:
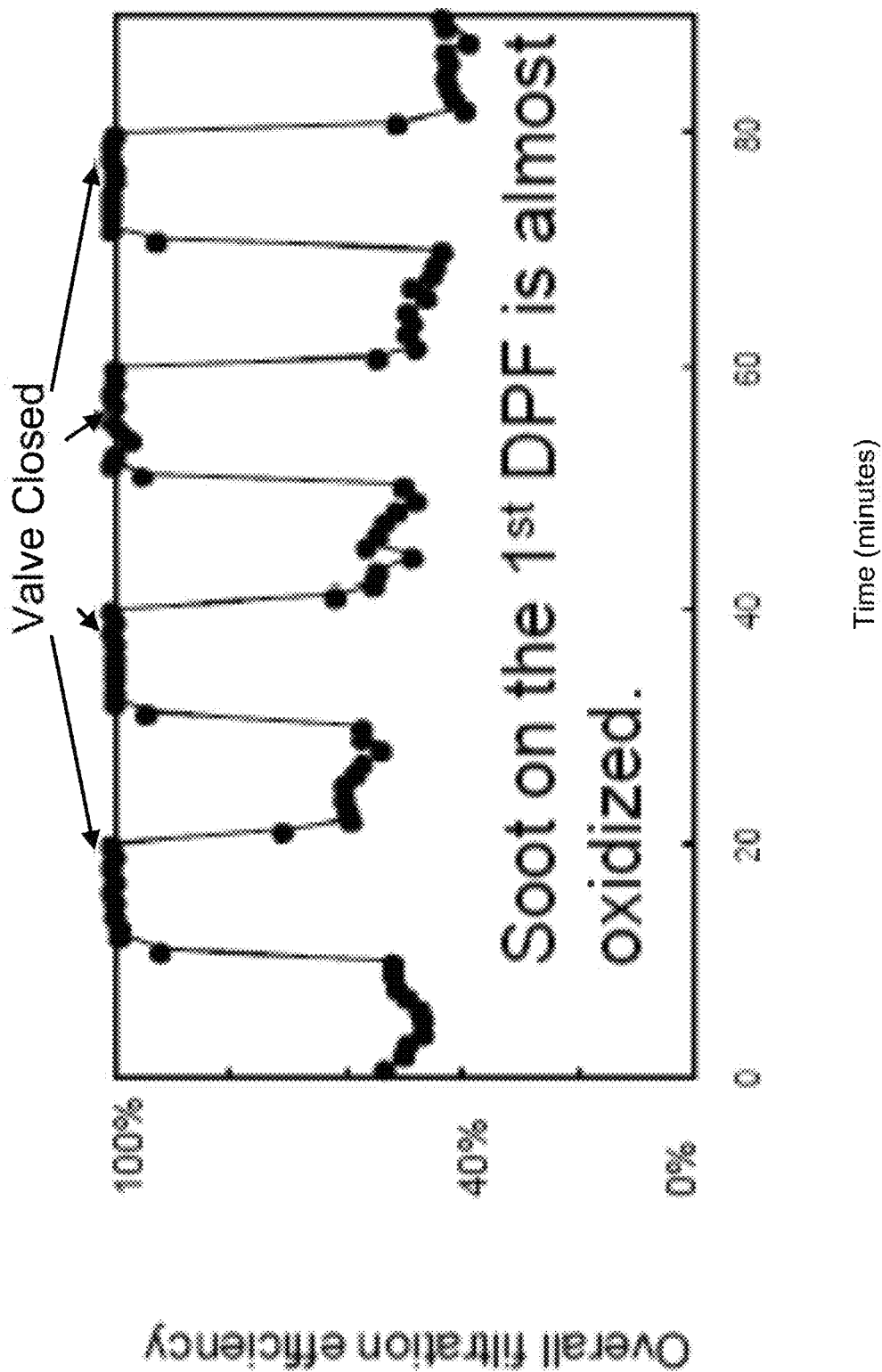
FIG. 10 is a plot of overall filtration efficiency of an aftertreatment system including a first filter and a second filter positioned downstream of the first filter.

FIG. 10 is a plot of overall filtration efficiency vs. time of an aftertreatment system coupled to an engine operating at high engine load. The aftertreatment system includes a first filter having a first filtration efficiency and a second filter having a second filtration efficiency greater than the first filtration efficiency. The second filter is positioned downstream of the first filter. For example, the first filter may be a new filter or a recently regenerated filter and the first filtration efficiency may be lower than a first filtration efficiency threshold which does not provide sufficient filtration efficiency to meet a particle emissions standard desirable from the aftertreatment system.

The aftertreatment system also includes a bypass conduit (e.g., bypass conduit 345, 445, 545) having a valve (e.g., the valve 344, 460, 544) disposed thereon, and configured to allow at least a portion of the exhaust gas to bypass the second filter when the valve is open. As shown in FIG. 10, when the valve is open such that the exhaust gas or a large portion of the exhaust gas bypasses the second filter, the overall filtration efficiency of the aftertreatment system is about 50% corresponding to the first filtration efficiency, which may be below a desired filtration efficiency from the aftertreatment system. In contrast, when the valve is closed, a large portion or substantially all of the exhaust gas is forced to flow through the second filter. In this configuration, the overall filtration efficiency of the aftertreatment system is about 100% corresponding to the filtration efficiency of each of the first and second filters, as previously described herein. This shows that including the second filter in the aftertreatment system may selectively increase the filtration efficiency of the aftertreatment system by closing the valve, and may selectively increase a fuel economy of the engine by opening the valve to reduce a backpressure on the exhaust gas, as previously described herein.

Figure 11B:
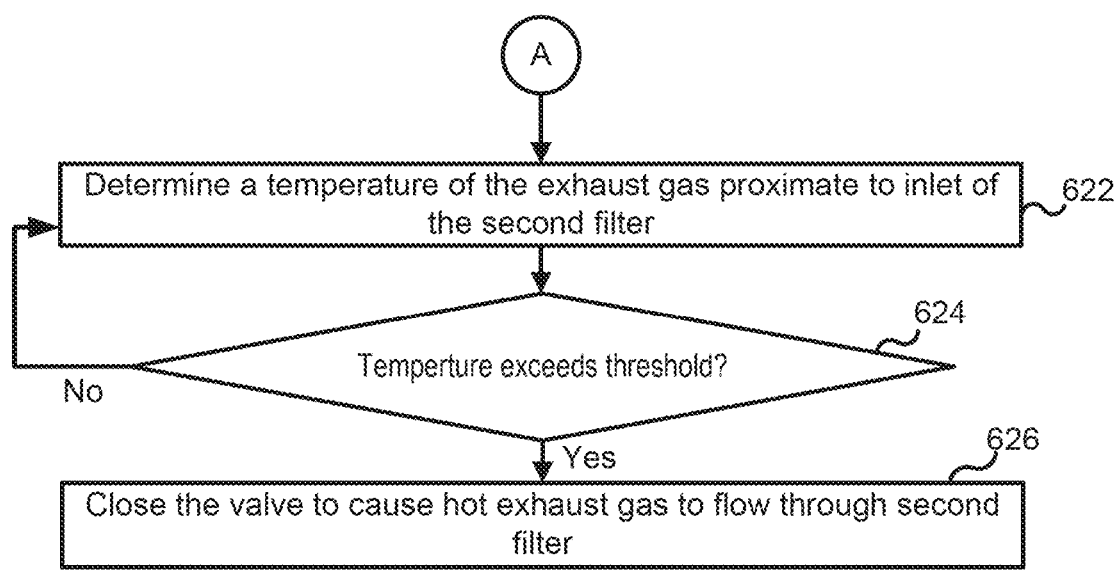

FIGS. 11A-11B are schematic flow diagrams of a method 600 for controlling filtration efficiency and fuel economy of an aftertreatment system, according to an embodiment. The aftertreatment system (e.g., the aftertreatment system 300, 400, 500) may include a first filter (e.g., the first filter), a second filter (e.g., the second filter 142, 442, 542) positioned downstream of the first filter, a bypass conduit (e.g., the bypass conduit 345, 445, 545) fluidly coupling an exhaust gas flow path downstream of the first filter and upstream of the second filter to an exhaust gas flow path downstream of the second filter and a valve (e.g., the valve 344, 460, 544) operatively coupled to the bypass conduit. In various embodiments, the aftertreatment system may also include a SCR system (e.g., the SCR system 150) positioned upstream or downstream of the second filter.

The method 600 includes determining an operating condition of the engine, at 602. For example, the controller 370 may be configured to receive a signal from the engine, the first sensor 103, the second sensor 105, the pressure sensor 346 or the first pressure sensor 348 to determine the operating condition of the engine. At 604, it is determined if the engine is operating under a high PM operating condition. In response, to the engine operating under the high PM operating condition (604:YES) (or otherwise if a high filtration efficiency is desired), the valve is opened a first predetermined amount, at 606 such that the valve is more closed than open so as to cause a larger portion of the exhaust gas to flow through the second filter than the bypass conduit and provide high filtration efficiency. For example, the controller 370 may be configured to cause the valve 344, 460, 544 to slightly open or be substantially closed so as to cause a larger portion of the exhaust gas (e.g., substantially all of the exhaust gas) to flow through the second filter, therefore providing high filtration efficiency.

In response to the engine operating under a low PM operating condition (604:NO) (or otherwise, if high fuel economy is desired), the valve is opened a second predetermined amount, at 608 such that the valve is more open than closed so as to cause a larger portion of the exhaust gas to flow through the bypass conduit and provide high fuel economy. For example, the controller 370 may cause the valve 344, 460, 544 to open a large degree, for example, completely open so as to allow a larger portion of the exhaust gas (e.g., substantially all of the exhaust gas) to bypass the second filter (e.g., the second filter 142, 442, 542) via the bypass conduit (e.g., the bypass conduit 345, 445, 545), therefore reducing backpressure on the exhaust gas and providing high fuel economy.

In some embodiments, the method 600 also includes determining a first filtration efficiency of the first filter, at 610. For example, the controller 370 may determine a first pressure drop across the first filter 140, determine a flow rate of the exhaust gas, and determines the first filtration efficiency of the first filter 140 based on a pressure drop across the first filter and an exhaust flow rate, as previously described herein.

At 612, it is determined if the first filtration efficiency exceeds a predetermined filtration efficiency threshold, for example, determined by the controller 370. If the first filtration efficiency is less than the predetermined filtration efficiency threshold (612:NO), for example, corresponding to a desired filtration efficiency of the aftertreatment system, the method 600 returns to operation 610. In response to the first filtration efficiency exceeding the predetermined filtration efficiency threshold, the valve is opened a predetermined amount, at 614, for example, completely opened to allow at least a portion or substantially all of the exhaust gas to bypass the second filter via the bypass conduit. This reduces backpressure on the exhaust gas and increases fuel economy, while providing the desired filtration efficiency via the first filter.

In some embodiments, the method 600 also includes determining a pressure drop across the second filter, at 616. For example, the controller 370 may interpret a signal from the pressure sensor 346 to determine a pressure drop across the second filter. At 618, it is determined if the pressure drop exceeds a pressure drop threshold. The pressure drop may correlate to an amount of clogging corresponding to an amount of back pressure exerted on the exhaust gas. If the pressure drop is less than the pressure drop threshold (618:NO), the method returns to operation 616. In response to the pressure drop being greater than the predetermined threshold (e.g., corresponding to the exhaust gas back pressure being too high), the valve is opened (e.g. by the controller 370) to allow at least a portion of the exhaust gas to bypass the second filter via the bypass conduit so as to decrease a back pressure on the exhaust gas.

In some embodiments, the method 600 also comprises determining a temperature of the exhaust gas proximate to an inlet of the second filter, at 622. For example, the controller 370 may be configured to receive a temperature signal from the temperature sensor 341 and interpret the temperature signal to determine the temperature of the exhaust gas at the inlet of the second filter. At 624, it is determined if the temperature exceeds a predetermined temperature threshold. If the temperature is lower than the predetermined temperature threshold, the method 600 returns to operation 622. In response to the temperature of the exhaust gas being above or greater than the predetermined temperature threshold, the valve is closed so as to force hot exhaust gas to flow through the second filter for regenerating the filter. For example, the controller 370 may be configured to close the valve 344, 460, 544 to force the exhaust gas through the second filter 142, 442, 542 so as to regenerate the second filter. In some embodiments, in which the aftertreatment system includes a hydrocarbon insertion assembly (e.g., the hydrocarbon insertion assembly 122) the method may also include inserting hydrocarbons into an oxidation catalyst (e.g., the oxidation catalyst 130) for raising the temperature of the exhaust gas above the predetermined temperature threshold.

Figure 12:
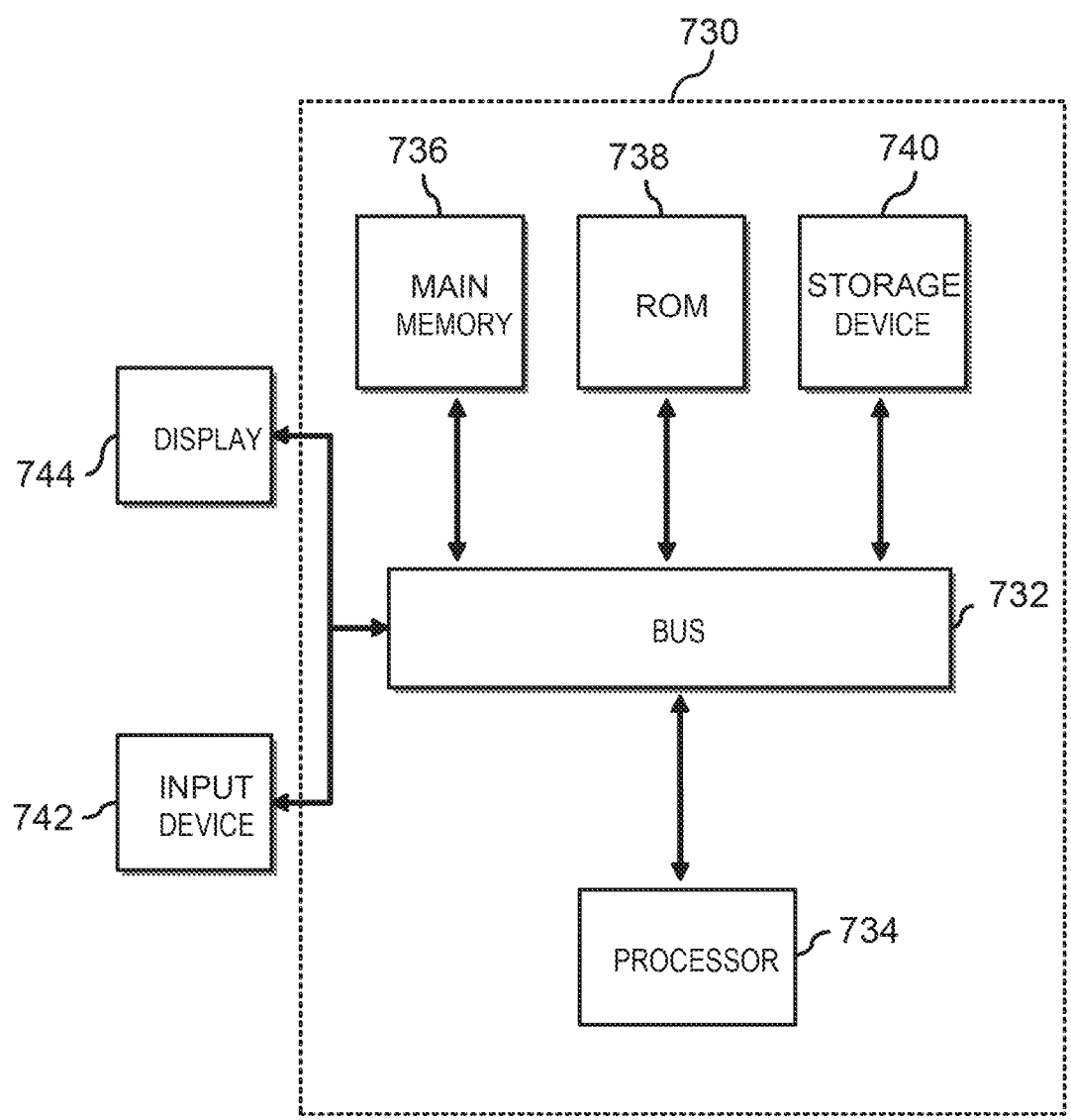
FIG. 12 is a schematic block diagram of a computing device which may be used as the controller shown in FIG. 3A-3B, 4, 6 or 9, according to an embodiment.

In some embodiments, the controller 370, the control circuitry 371, or any of the controller or control circuitries described herein may comprise a system computer of an apparatus or system which comprises the aftertreatment system 300, 400, 500 (e.g., a vehicle, an engine or generator set, etc.). For example, FIG. 12 is a block diagram of a computing device 730 in accordance with an illustrative implementation. The computing device 730 can be used to perform any of the methods or the processes described herein, for example, the method 200, or 600. In some embodiments, the controller 370 may comprise the computing device 730. The computing device 730 comprises a bus 732 or other communication component for communicating information. The computing device 730 can also comprise one or more processors 734 or processing circuits coupled to the bus 732 for processing information.

The computing device 730 also comprises main memory 736, such as a random access memory (RAM) or other dynamic storage device, coupled to the bus 732 for storing information and instructions to be executed by the processor 734. Main memory 736 can also be used for storing position information, temporary variables, or other intermediate information during execution of instructions by the processor 734. The computing device 730 may further comprise ROM 738 or other static storage device coupled to the bus 732 for storing static information and instructions for the processor 734. A storage device 740, such as a solid-state device, magnetic disk or optical disk, is coupled to the bus 732 for persistently storing information and instructions. For example, instructions corresponding operations of the method 200, 600 can be stored on the storage device 740. The computing device 730 may be coupled via the bus 732 to a display 744, such as a liquid crystal display or active matrix display, for displaying information to a user. An input device 742, such as a keyboard or alphanumeric pad, may be coupled to the bus 732 for communicating information and command selections to the processor 734.

According to various implementations, the methods described herein can be implemented by the computing device 730 in response to the processor 734 executing an arrangement of instructions contained in main memory 736 (e.g., the operations of the method 200). Such instructions can be read into main memory 736 from another non-transitory computer-readable medium, such as the storage device 740. Execution of the arrangement of instructions contained in main memory 736 causes the computing device 730 to perform the illustrative processes described herein. One or more processors in a multi-processing arrangement may also be employed to execute the instructions contained in main memory 736. In alternative implementations, hard-wired circuitry may be used in place of or in combination with software instructions to effect illustrative implementations. Thus, implementations are not limited to any specific combination of hardware and software.

Although an example computing device has been described in FIG. 12, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificiallygenerated propagated signal. The computer storage medium can also be, or be included in, one or more separate components or media (e.g., multiple disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, or flash drives). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices) or magnetic disks (e.g., internal hard disks or removable disks). The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the terms "substantially' and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

As used herein, the term "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filtration assembly for removing particulate matter from exhaust gas produced by an engine, comprising:
a first filter;
a second filter positioned downstream of the first filter; and
a valve comprising:
a first ring defining a plurality of first openings, and
a second ring defining a plurality of second openings, the second ring abutting the first ring,
wherein the valve is moveable between a closed position in which the plurality of first openings are misaligned with the plurality of second openings to prevent a fluid from flowing through the plurality of first and second openings, and an open position in which the second ring is rotated relative to the first ring such that the plurality of first openings are aligned with the plurality of second openings allowing the fluid to flow therethrough,
wherein a first end of the valve is proximate to an outlet of the first filter, and a second end of the valve is proximate to an inlet of the second filter, and
wherein, in the closed position of the valve, substantially all of the exhaust gas flows through the second filter, and in the open position of the valve, at least a portion of the exhaust gas flows through the valve and bypasses the second filter.

2. The filtration assembly of claim 1, further comprising a bypass conduit fluidly coupling an exhaust gas flow path downstream of the first filter and upstream of the second filter to an exhaust gas flow path downstream of the second filter, and wherein in the open position of the valve, at least the portion of the exhaust gas flows through the bypass conduit.

3. The filtration assembly of claim 2, wherein a diameter of the second filter is smaller than a diameter of the first filter.

4. The filtration assembly of claim 3, further comprising a housing, wherein the first filter, the second filter, and the valve are positioned within the housing such that the bypass conduit is defined between an outer surface of the second filter and an inner surface of the housing.

* * * * *